OPTICAL COUPLER HAVING SEGMENTED WAVEGUIDES FOR COUPLING ELECTROMAGNETIC FIELD

US010444434B2

(12) United States Patent
Qi et al.

(10) Patent No.: US 10,444,434 B2
(45) Date of Patent: Oct. 15, 2019

(54) OPTICAL COUPLER HAVING SEGMENTED WAVEGUIDES FOR COUPLING ELECTROMAGNETIC FIELD

(71) Applicant: Purdue Research Foundation, West Lafayette, IN (US)

(72) Inventors: Minghao Qi, West Lafayette, IN (US); Min Teng, West Lafayette, IN (US); Kyunghun Han, West Lafayette, IN (US); Sangsik Kim, West Lafayette, IN (US); Ben Niu, West Lafayette, IN (US); Yun Jo Lee, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/185,761

(22) Filed: Nov. 9, 2018

(65) Prior Publication Data

US 2019/0170936 A1 Jun. 6, 2019

Related U.S. Application Data

(63) Continuation of application No. 15/797,528, filed on Oct. 30, 2017, now Pat. No. 10,126,500.

(Continued)

(51) Int. Cl.
*G02B 6/124* (2006.01)
*G02B 6/122* (2006.01)
*G02B 6/36* (2006.01)
*G02B 5/18* (2006.01)
*G02B 6/30* (2006.01)

(52) U.S. Cl.
CPC .......... *G02B 6/124* (2013.01); *G02B 5/1809* (2013.01); *G02B 6/1228* (2013.01); *G02B 6/305* (2013.01); *G02B 6/3636* (2013.01)

(58) Field of Classification Search
CPC ...... G02B 6/124; G02B 6/3636; G02B 6/305; G02B 6/1228; G02B 5/1809
See application file for complete search history.

(56) References Cited

U.S. PATENT DOCUMENTS 6,411,765 B1  6/2002  Ono
9,726,821 B2  8/2017  Murray et al.
(Continued)

OTHER PUBLICATIONS

Almeida, V., "Nanotaper for Compact Mode Conversion", Optics Letters, Aug. 1, 2003, vol. 28, No. 15, pp. 1302-1304.
Barwicz, T., "An O-Band Metamaterial Converter Interfacing Standard Optical Fibers to Silicon Nanophotonic Waveguides", Optical Society of America, 2015, 3 pages.
Cheben, P., et al., "Broadband polarization independent nanophotonic coupler for silicon waveguides with ultra-high efficiency", Optics Express, 23, 22553-22563 (2015).
(Continued)

*Primary Examiner* — Andrew Jordan
(74) *Attorney, Agent, or Firm* — Lee & Hayes, P.C.

(57) ABSTRACT

A semiconductor photonic device includes a substrate, facet(s), and optical coupler(s) associated with the facet(s). Each optical coupler can couple an electromagnetic field incident on the respective facet towards a buried waveguide as the electromagnetic field proceeds into the semiconductor photonic device. In some examples, each coupler has waveguides extending in a longitudinal direction and at least partly encapsulated within a cladding layer. In some examples, at least one waveguide tapers along its length. In some examples, at least one waveguide includes spaced-apart segments arranged to form a subwavelength grating (SWG) configured to entrain electromagnetic radiation.

20 Claims, 21 Drawing Sheets

Related U.S. Application Data

(60) Provisional application No. 62/415,770, filed on Nov. 1, 2016.

(56) References Cited

U.S. PATENT DOCUMENTS

| | | | |
|---|---|---|---|
| 9,759,864 | B2 | 9/2017 | Painchaud et al. |
| 9,904,011 | B2 | 2/2018 | Raton et al. |
| 10,126,500 | B2 * | 11/2018 | Qi .......................... G02B 6/124 |
| 10,197,731 | B2 * | 2/2019 | Teng ................... G02B 6/1228 |
| 2018/0067259 | A1 * | 3/2018 | Teng ................... G02B 6/1228 |
| 2018/0120504 | A1 * | 5/2018 | Qi .......................... G02B 6/124 |
| 2019/0154919 | A1 * | 5/2019 | Teng ................... G02B 6/1228 |
| 2019/0170936 | A1 * | 6/2019 | Qi .......................... G02B 6/124 |

OTHER PUBLICATIONS

Halir, R., et al, "Waveguide sub-wavelength structures: a review of principles and applications", Laser Photonics Rev. 9, No. 1, 25-49, 2015.

Hatori, N., et al., "A Hybrid Integrated Light Source on a Silicon Platform Using a Trident Spot-Size Converter", Journal of Lightwave Technology, vol. 32, No. 7, Apr. 1, 2014, pp. 1329-1336.

Office action for U.S. Appl. No. 15/694,277, dated Jun. 26, 2018, Teng, "Optical Coupler", 9 pages.

Ren, G., et al., "Suldy on Inverse Taper Based Mode Transformer for low loss Coupling Between Silicon Wire Waveguide and Lensed Fiber", Optics Communications 284, 2011, pp. 4782-4788.

Tu, et al., "Low Polarization-Dependent-Loss Silicon Photonic Trident Edge Coupler Fabricated by 248 nm Optical Lithography", Asia Communications and Photonics Conference (2015).

* cited by examiner

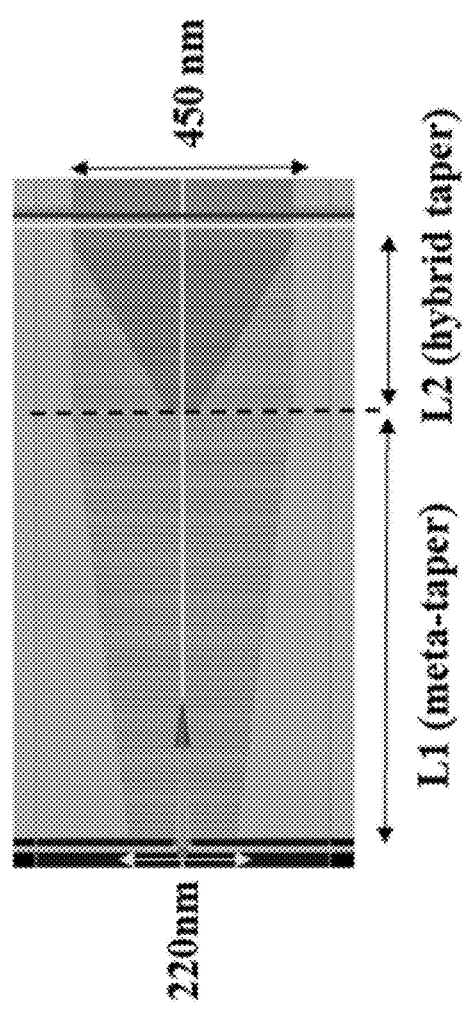
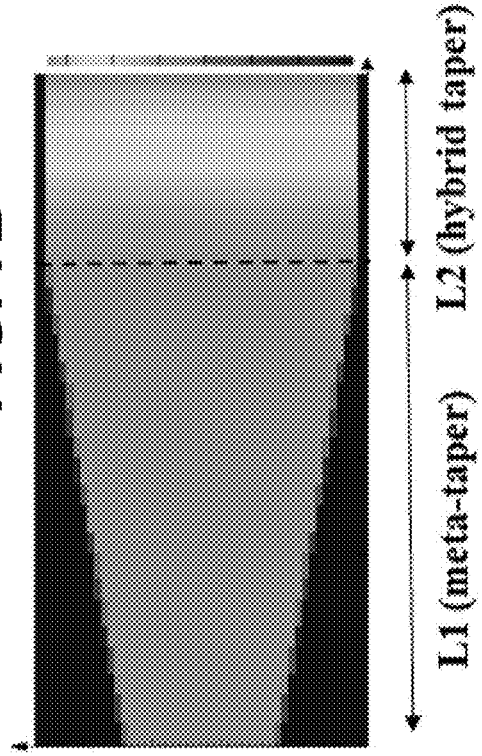
FIG. 7A
FIG. 7B

OPTICAL COUPLER HAVING SEGMENTED WAVEGUIDES FOR COUPLING ELECTROMAGNETIC FIELD

CROSS-REFERENCE TO RELATED APPLICATIONS

This application is a continuation of U.S. patent application Ser. No. 15/797,528, filed Oct. 30, 2017, and entitled "Optical Coupler Having Exposed Subwavelength Gratings for Coupling Electromagnetic Field", which is a nonprovisional application of, and claims priority to and the benefit of, U.S. Patent Application Ser. No. 62/415,770, filed Nov. 1, 2016, and entitled "Optical Coupler Having Subwavelength Grating" the entirety of which is incorporated herein by reference.

BACKGROUND

Semiconductor (e.g., silicon, Si) optoelectronics and photonic devices are increasingly popular. To communicate between such devices on chip, some silicon chips that perform photonic processing couple light in and out of optical fibers. An example of such a fiber is CORNING SMF-28, designed for use in the $\lambda=1310$ nm window and the $\lambda=1550$ nm window commonly used in telecommunications. SMF-28 has a mode-field diameter (MFD) of 9.2±0.4 µm at 1310 nm and of 10.4±0.8 µm at 1550 nm.

BRIEF DESCRIPTION OF THE DRAWINGS

Objects, features, and advantages of various aspects will become more apparent when taken in conjunction with the following description and drawings. Identical reference numerals have been used, where possible, to designate identical features that are common to the figures.

FIG. 7A shows a top view of a simulated structure.

FIG. 7B shows simulation results.

The attached drawings are for purposes of illustration and are not necessarily to scale.

DETAILED DESCRIPTION

Steps, operations, or features of various methods described herein can be performed in any order except when otherwise specified, or when data from an earlier step is used in a later step. Example method(s) described herein are not limited to being carried out by components particularly identified in discussions of those methods. The terms "I," "we," "our" and the like herein do not refer to any specific individual or group of individuals.

As used herein, the terms "light" and "optical," and similar terms, are not restricted to the visible range. "Light" refers to electromagnetic radiation of whatever wavelength. Some examples couplers herein have waveguide and layer dimensions permitting effective coupling of at least one of the following ranges or bands of wavelengths of light: infrared (e.g., ~750 nm-~1 mm, near-infrared, far-infrared, visible (e.g., ~400 nm-~700 nm), ultraviolet, telecommunications (e.g., ~1260 nm-~1675 nm), or specific telecommunications bands (e.g., the "1310 window," ~1260 nm-~1360 nm, the "1550 window," ~1530 nm-~1565 nm, or ~1520 nm-~1620 nm).

Some examples include method(s) of manufacturing couplers. Such method(s) can include performing SOI CMOS fabrication processes, e.g., including deposition, masking, etching, developing, planarizing, scribing, breaking, or polishing steps, in any combination, to provide structures such as those described herein.

Various examples relate to an edge coupler for standard single mode fiber based on SOI substrate. Some example couplers include waveguides including subwavelength gratings or other discontinuous structures. Some example couplers include one or more waveguides, tapered or non-tapered. The waveguides can guide optical mode during mode evolution, e.g., as discussed herein.

As noted above, optical fibers can have mode-field diameters around 9-10 µm. However, Si devices require very small cross-sections, e.g., 0.25-0.5 µm in width and height. This is much smaller than mode-field diameter (e.g., approximately the core size) of optical fibers (e.g., ~9 µm). Therefore, a great deal of light is lost in a butt-coupling, e.g., from 9 µm diameter to 0.25 µm×0.5 µm. There is a need for a low-loss fiber-to-silicon light coupler.

Figure 1A:
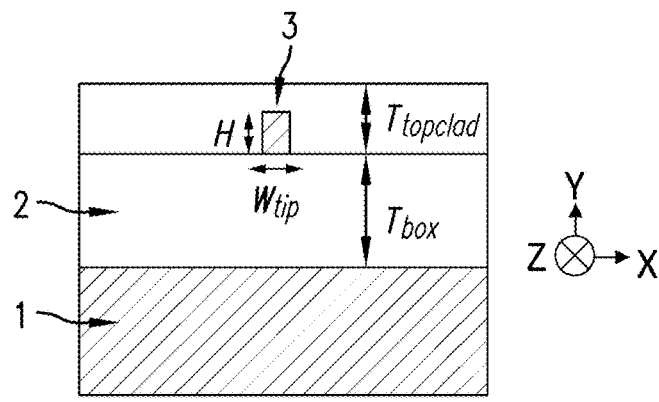
FIG. 1A shows a front view of an Si inverse tapered waveguide.
Figure 1B:
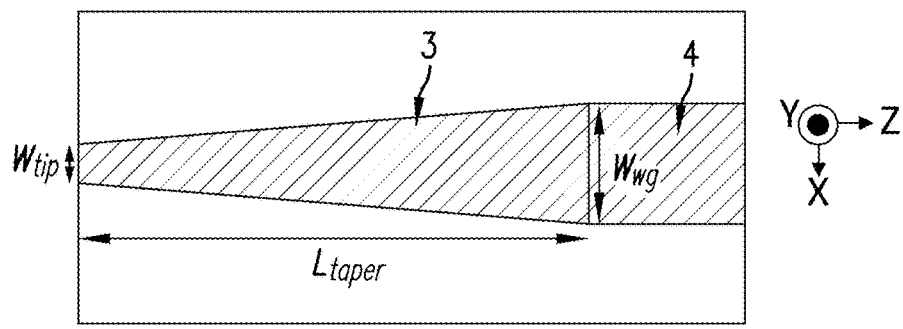
FIG. 1B shows a top view of an Si linear inverse tapered waveguide.

Silicon inverse nano-tapers are promising as fiber-to-chip edge couplers due to the perceived advantages of broadband performance and the ease of on-chip integration. A prior Si inverse taper is shown in FIG. 1A and FIG. 1B, where Si taper 3 is embedded in $SiO_2$ 2. Top view shows taper width expands linearly from tip width $W_{tip}$ up to $W_{wg}$ (usually 450 nm for single mode Si waveguide with H=220 nm) in a length of $L_{taper}$. For taper fabricated on a SOI wafer, the buried oxide (BOX) layer can reduce power leakage from waveguide 4 to Si substrate 1. However, most commercially available BOX has thickness less than 3 micrometers, hence this conventional inverse taper does not suit for standard cleaved fiber (SMF-28) with mode field diameter (MFD) ($1/e^2$ power diameter in a Gaussian profile) around 10 μm. A solution is to use lensed fiber to focus the input beam onto the taper tip such that input mode has a reduced size and so experiences reduced leakage. Another alternative is to deploy tapered fiber core to achieve mode size reduction yet both techniques have not yet become a solution for industry due to their higher costs and significantly increased alignment and packaging challenge.

Some embodiments follow at least one of the following design guidelines for inverse tapers embedded in an $SiO_2$ background. An example guideline is that, since there is no intermediate cladded waveguide (total internal reflection) to trap the injected beam, the tip width at a facet (e.g., facet 308, FIG. 3) of the coupler can be designed to trap the injected beam upon arrival at the facet. Therefore, the facet cross-section can be designed to support $TE_{00}$ and $TM_{00\ modes}$ with acceptable overlap with an input Gaussian mode, although some mode mismatch loss at the facet is introduced. Another guideline is that is mode transition loss scales up with input MFD but down with taper length. Mode conversion efficiency can be enhanced when the mode center is aligned with the Si taper.

In fact, even if the bottom Si substrate is replaced by index matching material, to reduce leakage, an inverse-taper based edge coupler still does not serve as good solution for SMF-28. For example, the large input MFD requires excessive taper length (which increases scattering loss due to sidewall roughness) to reduce transition loss even if the mode is aligned with the Si taper. Another problem is the birefringence introduced at tip coupling. In order to match with 10 um MFD input Gaussian mode, tip width may be required to be narrow for a 220 nm thick (for example) Si wafer. If the taper tip is not a square shape, the supported $TE_{00}$ and $TM_{00}$ deviate from each other, meaning acceptable mode overlap at the facet cannot be reached for both TE and TM polarizations with some prior schemes. In at least one example, with discontinuous taper at subwavelength scale, the tip can be designed as square shape to match both polarizations. With discontinuous metamaterial taper, a prior scheme exhibited 1.3 dB loss with SMF-28 fiber, although suspended structure with index matching material filling is not an industrialized manufacturing process.

Figure 1C:
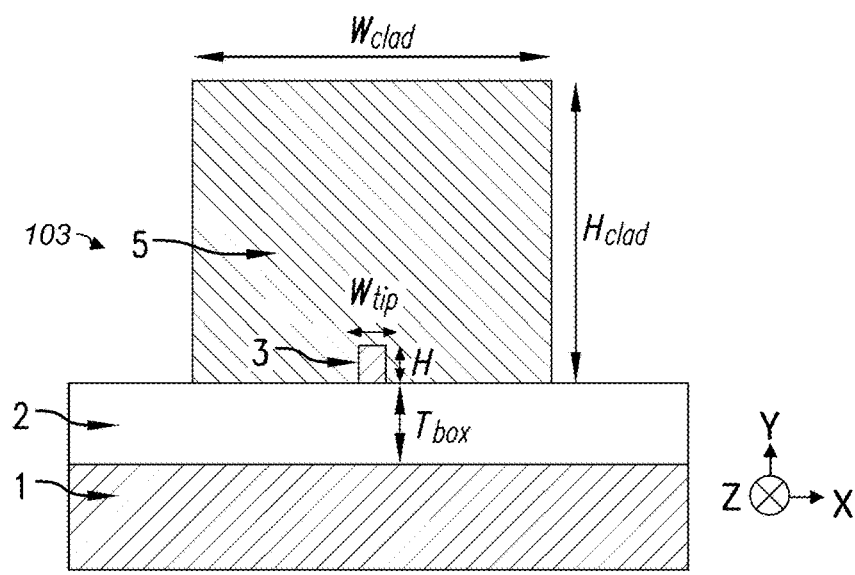
FIG. 1C shows a front view of an Si inverse tapered, cladded waveguide.

An alternative design of edge coupler for large-MFD fiber is to clad an intermediate waveguide on top of Si taper, as shown in FIG. 1C. The waveguide has refractive index higher than that of the BOX to confine the injected beam, and the waveguide's dimensions support a fundamental mode overlapping with the input beam (with a relatively large MFD) from standard cleaved fiber. Here $W_{tip}$ can be reduced since the mode is initially guided in intermediate cladded waveguide 5 when the taper width is too narrow to guide the mode. Given the same top view in FIG. 1B, $W_{tip}$ should be as narrow as possible to reduce overlap and index mismatch in order to achieve acceptable tip coupling efficiency. Such designs, however, can cause vertical displacement between the input beam and Si taper, rendering evanescent coupling much less efficient. In addition, only polymer materials (such as SU-8) can be used as CMOS-compatible candidates for intermediate waveguide, but organic polymer may not be as reliable as SOI for commercial applications. In addition, multi-mode cladded waveguide can also lead to multimode interference (especially given input misalignment), which can be undesirable.

Various examples include an edge coupler on a SOI platform without cladded waveguide. Various examples do not require Si substrate removal or index matching material filling. Various examples are compatible with standard CMOS fabrication process and offers desirable tolerance to index variations.

Example embodiments involve the tip design at a facet of a coupler. In some examples, a mode can be trapped at several microns on top of BOX layer to reduce leakage towards the substrate. This can be done with initially depositing thick $SiO_2$ first, before building the taper layer, and ultimately covering the structure with $SiO_2$ top cladding. The taper material can be or include (but is not confined to) SiN and amorphous Si.

Illustrative Examples

Figure 1D:
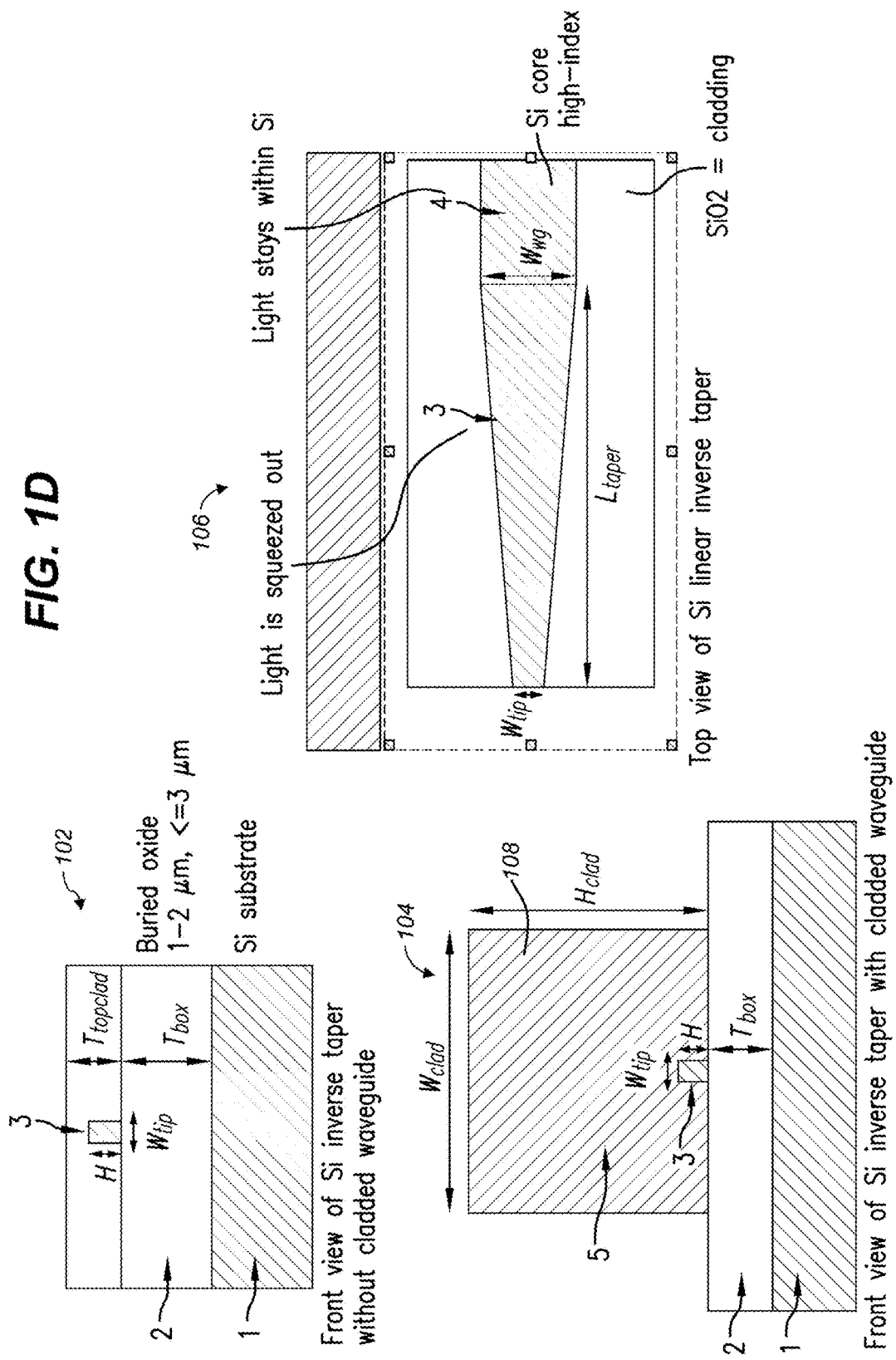
FIG. 1D shows examples of waveguides.

FIG. 1A illustrates a prior scheme, and shows a front view of an Si inverse taper coupler without a cladded waveguide. Vertically, the waveguide is constant-thickness. Examples are single-mode. In FIG. 1D, the note "light is squeezed out" refers to the fact that, as electromagnetic radiation progresses leftward and the tip width decreases, the amount of the electromagnetic energy carried in the Si core decreases (and the opposite for light moving from left to right).

FIG. 1B shows a top view of the Si linear inverse taper of FIG. 1A. In prior schemes, a light source, e.g., an optical fiber, is to the left side of FIG. 1B, and light can propagate from left to right. In area 3, cross-section (mode field diameter) expands. Expanded mode is about the same size as an optical fiber core. In area 4, the width is about 0.45 μm, so the light is confined.

However, structures as in FIGS. 1A and 1B are limited by commercial silicon-processing limitation. For example, commercial-grade BOX is at most 3 μm thick, which limits the mode field width. Light that couples to the Si substrate will be lost. Therefore in order to reduce leakage towards substrate, the core of initial receiving waveguide is elevated.

FIG. 1C shows a structure 103 of an Si inverse taper with a cladded waveguide according to a prior scheme in which the fiber mode couples to the cladded waveguide and then is confined to within the taper. As the Si expands along the direction of propagation, the field is guided into the core. The cladding can be made very large, e.g., the same size as the fiber mode. However, a large enough waveguide such as in FIG. 1C is a multi-mode guide, not a single-mode guide. Therefore, fiber misalignment can cause multi-mode interference because not only the fundamental mode, but also higher-order modes, of the waveguide will be excited. This results in coupling loss.

As used herein, the term "over," when used in reference to layered structures or components of or assembled into structures, describes arrangements of those layers or components with respect to each other. The term "over" does not imply, and expresses arrangement without regard to, the physical orientation of any particular coupler or other device comprising those layers or components. For example, in FIG. 1C, within structure 103, the cladding 5 is partly over the waveguide 3. The waveguide 3 is over the buried-oxide (BOX) layer 2. The BOX layer 2 is over the semiconductor substrate 1. These relationships hold regardless of whether structure 103 is turned upside-down, sideways, or in another direction; rotated; stretched; or otherwise caused to undergo an affine transformation in two- or three-dimensional space. For example, these relationships hold regardless of whether structure 103 as a whole is oriented right-side up (parts 5, 2, and 1 arranged in that order along the local gravity force vector), upside down (parts 1, 2, and 5 in that order along the local gravity force vector), or any other orientation. Unless otherwise indicated, first structures arranged "over" second structures can be directly mounted on, disposed on, or affixed to the second structures. Additionally or alternatively, unless otherwise indicated, the first structures can be or mounted or disposed on, or affixed to, one or more of a group of one or more intervening layers or structures, and at least one layer or structure of the group can be mounted or disposed on, or affixed to, at least one second structure. For example, waveguide 3 is arranged over substrate 1 in the example of FIG. 1C, with BOX layer 2 being an intervening structure.

FIG. 1D shows examples of various configurations 102, 104, and 106 of couplers. In some examples, cladding 108 has n>$SiO_2$, n<Si, e.g., activated polymers such as SU-8.

Figure 2:
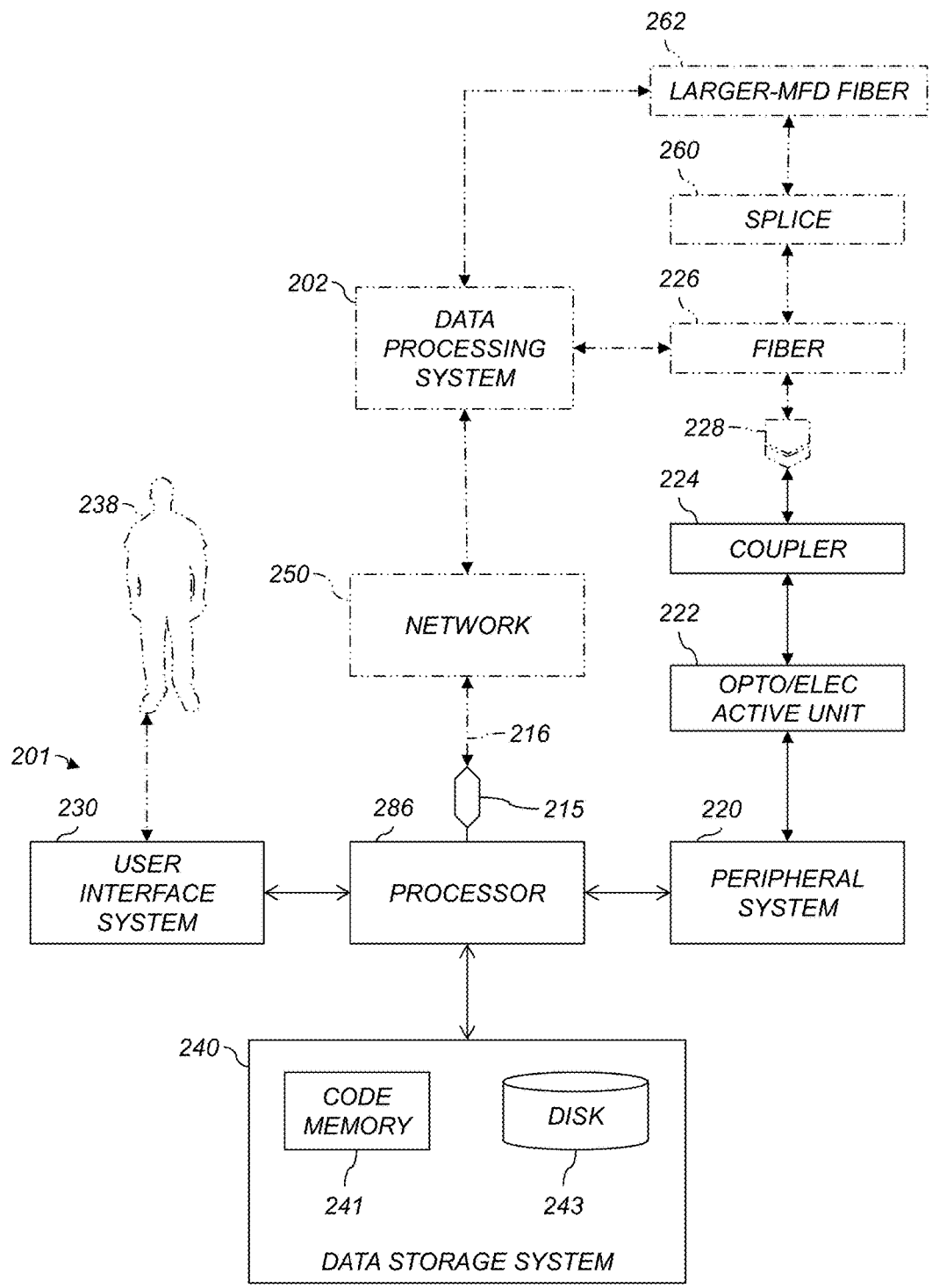
FIG. 2 is a high-level diagram showing the components of a data-processing system, and related components.

FIG. 2 is a high-level diagram showing the components of an example data-processing system 201 for analyzing data or performing other computation or analysis, and related components. Example systems according to FIG. 2 can include or couple to optical fibers, as discussed below. The system 201 includes a processor 286, a peripheral system 220, a user interface system 230, and a data storage system 240. The peripheral system 220, the user interface system 230, and the data storage system 240 are communicatively connected to the processor 286. Processor 286 can be communicatively connected to network 250 (shown in phantom), e.g., the Internet or a leased line, as discussed below. Systems 201 and 202 can each include one or more optical couplers as described herein, or one or more of systems 286, 220, 230, 240, and can each connect to one or more network(s) 250. Processor 286, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 286 can implement processes of various aspects described herein. Processor 286 and related components can, e.g., carry out processes for transmitting or receiving data by optical-electronic conversion. For example, processor 286 can operate a photodiode to receive data via an optical coupler as described herein, or can operate a laser diode to transmit data via an optical coupler as described herein.

Processor 286 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 220, user interface system 230, and data storage system 240 are shown separately from the processor 286 but can be stored completely or partially within the processor 286.

The peripheral system 220 can include or be communicatively connected with one or more devices configured or otherwise adapted to provide digital content records to the processor 286 or to take action in response to processor 186. For example, the peripheral system 220 can include digital still cameras, digital video cameras, cellular phones, or other data processors. The processor 286, upon receipt of digital content records from a device in the peripheral system 220, can store such digital content records in the data storage system 240.

The user interface system 230 can convey information in either direction, or in both directions, between a user 238 and the processor 286 or other components of system 201. The user interface system 230 can include a mouse, a keyboard, another computer (connected, e.g., via a network or a null-modem cable), or any device or combination of devices from which data is input to the processor 286. The user interface system 230 also can include a display device, a processor-accessible memory, or any device or combination of devices to which data is output by the processor 286. The user interface system 230 and the data storage system 240 can share a processor-accessible memory.

In various aspects, processor 286 includes or is connected to communication interface 215 that is coupled via network link 216 (shown in phantom) to network 250. For example, communication interface 215 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communication interface 215 sends and receives electrical, electromagnetic, or optical signals that carry digital or analog data streams representing various types of information across network link 216 to network 250. Network link 216 can be connected to network 250 via a switch, gateway, hub, router, or other networking device.

In various aspects, system 201 can communicate, e.g., via network 250, with a data processing system 202, which can include the same types of components as system 201 but is not required to be identical thereto. Systems 201, 202 can be communicatively connected via the network 250. Each system 201, 202 can execute computer program instructions to transmit or receive data optically.

Processor 286 can send messages and receive data, including program code, through network 250, network link 216, and communication interface 215. For example, a server can store requested code for an application program (e.g., a JAVA applet) on a tangible non-volatile computer-readable storage medium to which it is connected. The server can retrieve the code from the medium and transmit it through network 250 to communication interface 215. The received code can be executed by processor 286 as it is received, or stored in data storage system 240 for later execution.

Data storage system 240 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 286 can transfer data (using appropriate components of peripheral system 220), whether volatile or nonvolatile; removable or fixed; electronic, magnetic, optical, chemical, mechanical, or otherwise. Example processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 240 can be a tangible non-transitory computer-readable storage medium, i.e., a non-transitory device or article of manufacture that participates in storing instructions that can be provided to processor 286 for execution.

In an example, data storage system 240 includes code memory 241, e.g., a RAM, and disk 243, e.g., a tangible computer-readable rotational storage device or medium such as a hard drive. Computer program instructions are read into code memory 241 from disk 243. Processor 286 then executes one or more sequences of the computer program instructions loaded into code memory 241, as a result performing process steps described herein. In this way, processor 286 carries out a computer implemented process. For example, steps of methods described herein, blocks of the flowchart illustrations or block diagrams herein, and combinations of those, can be implemented by computer program instructions. Code memory 241 can also store data, or can store only code.

Various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 286 (and possibly also other processors), and that, when loaded into processor 286, cause functions, acts, or operational steps of various aspects herein to be performed by processor 286 (or other processor). Computer program code for carrying out operations for various aspects described herein may be written in any combination of one or more programming language(s), and can be loaded from disk 243 into code memory 241 for execution. The program code may execute, e.g., entirely on processor 286, partly on processor 286 and partly on a remote computer connected to network 250, or entirely on the remote computer.

In some examples, peripheral system 220 can include or be connected to at least one optical or electronic active unit 222 ("opto/elec active unit"). The active unit 222 can include, e.g., at least one of any of the following optical components or electronic components: lenses, mirrors, or gratings; microelectromechanical systems (MEMS) devices or structures such as movable micromirrors, resonators, or oscillators; photodiodes, photomultiplier circuits (solid-state, tube, or otherwise); other optical-to-electronic conversion devices; light-emitting diodes (LEDs); muxes, demuxes, modulators, detectors; other electronic components; lasers such as in-plane, vertically-emitting, or other laser diodes, or other semiconductor lasers, solid, liquid, or gas lasers; or other electronic-to-optical conversion devices.

In some examples, a peripheral system 220 can include or be connected to at least one coupler 224, e.g., as discussed herein with reference to at least one of: FIG. 3-6C, 13A, or 15.

In some examples, the coupler 224 can be connected to an optical fiber 226, e.g., via a connector 228. Connector 228 can include, e.g., a screw or snap connector such as an FC, LC, or MIC connector. A splice can be used in addition to or instead of connector 228. In the illustrated example, optical fiber 226 can be a networking fiber communicatively connected to system 202, but this is not limiting. In some examples, the coupler 224 can be connected to an optical fiber 226 via a splice. For example, the coupler 224 can be arranged at a facet 308 (FIG. 3) and a cleaved end of optical fiber 226 can be butted up against the facet 308 or otherwise disposed proximal to facet 308.

Coupler 224 can convey light (electromagnetic fields) between optical fiber 226 and active unit 222, e.g., light transmitted from system 201, light transmitted to system 201, or light in either direction.

In some examples, the optical fiber 226 can include a narrow-diameter or high-numerical-aperture (high-NA) fiber, e.g., NUFERN UHNA4. UHNA4 has a core diameter of ~2.2 µm, a core NA of ~0.35, and an MFD of ~2.6 µm at 1100 nm, ~3.3 µm at 1310 nm (O band), and ~4.0 µm at 1550 nm (C band). Optical fiber 226 can be coupled, e.g., via splice 260, to another optical fiber 262, e.g., an SMF-28 fiber. This can permit using smaller couplers on chip, e.g., single-layer couplers, even with larger-MFD fibers such as SMF-28.

In some examples, system 201 includes active unit 222 and coupler 224, e.g., integrated onto a microchip. In some examples, coupler 224 and active unit 222 are integrated into a fiber transceiver, e.g., in an edge card, pluggable module, or other form factor that is removably connectable to peripheral system 220. In some examples, system 201 includes none of, all of, or at least one of fiber 226, connector 228, splice 260, or fiber 262. In some examples, larger-MFD fiber 262 is coupled to coupler 224, e.g., through connector 228, without splice 260 or fiber 226.

Figure 3:
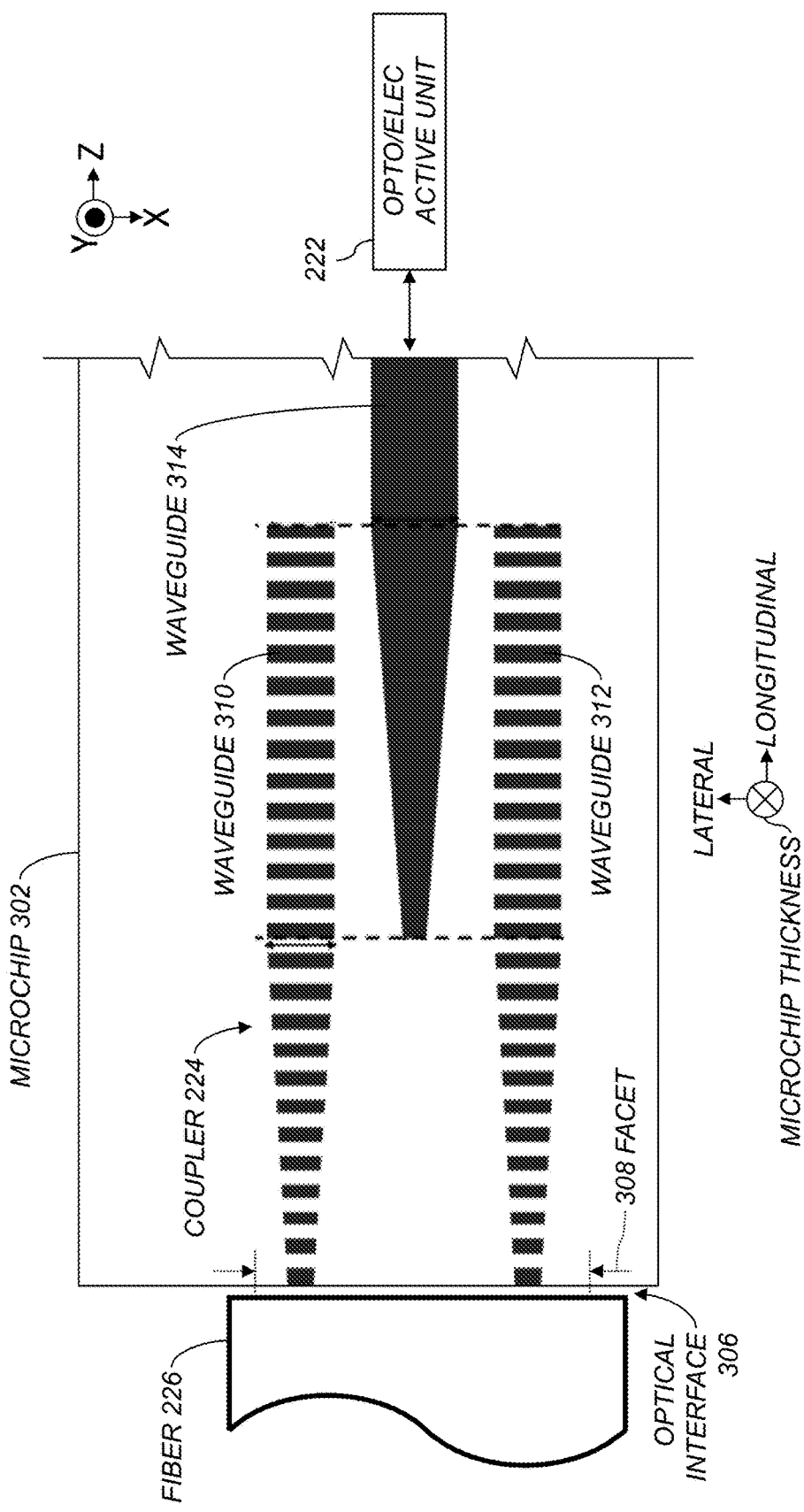
FIG. 3 is a schematic plan of an example optical fiber and microchip-embodied coupler.

FIG. 3 is an example of a configuration of a coupler 224 fabricated as part of a microchip 302 (e.g., fabricated as part of an Si or SOI wafer), and related components, according to various examples. Various examples can be used with photonic or electro-optical devices, e.g., active units 222, which can be fabricated on microchip 302 or communicatively connectable with microchip 302. Various examples of couplers can be used for any situation in which a change of mode field diameter is required, or in which the distance between the optical axis and a silicon (or other high-index) substrate has to be adjusted. Various examples can be used with non-silicon microchips 302 or other devices, e.g., III-V devices. FIG. 3 will be discussed with respect to light incident on microchip 302, but is not limited thereto; coupler 224 can operate in either direction.

Incident light propagating along fiber 226 reaches an optical interface 306 between the fiber 226 and the microchip 302. The optical interface 306 can include a butt coupling between an end face of the fiber 226 and a facet 308 of the coupler 224. The butt coupling can use, e.g., optically clear adhesive (OCA) or index-matching fluid between fiber 226 and facet 308, although this is not required. Additionally or alternatively, the optical interface 306 can include at least one lens, grating, or other component configured to direct light from the end face of the fiber to facet 308. Facet 308 can be provided, e.g., by cleaving microchip 302 or by polishing a surface of microchip 302. In this example, the coupler 300 includes three waveguides 310, 312, 314 extending substantially in a longitudinal direction. The lateral and longitudinal directions can be at, or substantially at, right angles to each other (e.g., substantially perpendicular, as shown, or can be at other angles to each other, e.g., at least 15° and less than 90°, or between 75° and. For example, the lateral direction can form an angle of at least 75° with the longitudinal direction, i.e., the angle between a vector in the lateral direction and a vector in the longitudinal direction can be at least 75° (or any other angle or angular range referred to in this paragraph). In this example, the facet 308 extends substantially in a lateral direction, and substantially in a third direction that is substantially perpendicular to both the lateral direction and the longitudinal direction (shown as "microchip thickness").

As used herein, the term "exposed waveguide" refers to a dielectric waveguide of coupler 224 that comprises a volume substantially as close to the facet 308 in the longitudinal direction as does any other waveguide of the coupler 224. In some examples, exposed waveguides are those waveguide(s) extending to within a predetermined distance of facet 308. In the example of FIG. 3, waveguides 310 and 312 are exposed waveguides, and inverse-tapered waveguide 314 is not an exposed waveguide. The term "exposed waveguide" does not require that the facet 308 be polished back to actually expose the dielectric to, e.g., ambient conditions. For example, waveguides 310 and 312 are discontinuous. In the illustrated example, each has dielectric (shown black) at facet 308. However, depending on the tolerances of polishing, semiconductor (shown white) might be present at facet 308 instead of dielectric. In either situation, waveguides 310 and 312 would still be exposed waveguides, as defined herein. In some examples, waveguides can be sorted by the smallest distance between each waveguide and the facet 308. The waveguides having substantially equal smallest distances are the exposed waveguides. Waveguides that are not exposed waveguides are referred to for brevity as "buried waveguides." For the avoidance of doubt, he use of "buried" in "buried waveguide" is not related to the use of "buried" in "buried oxide."

Figure 4:
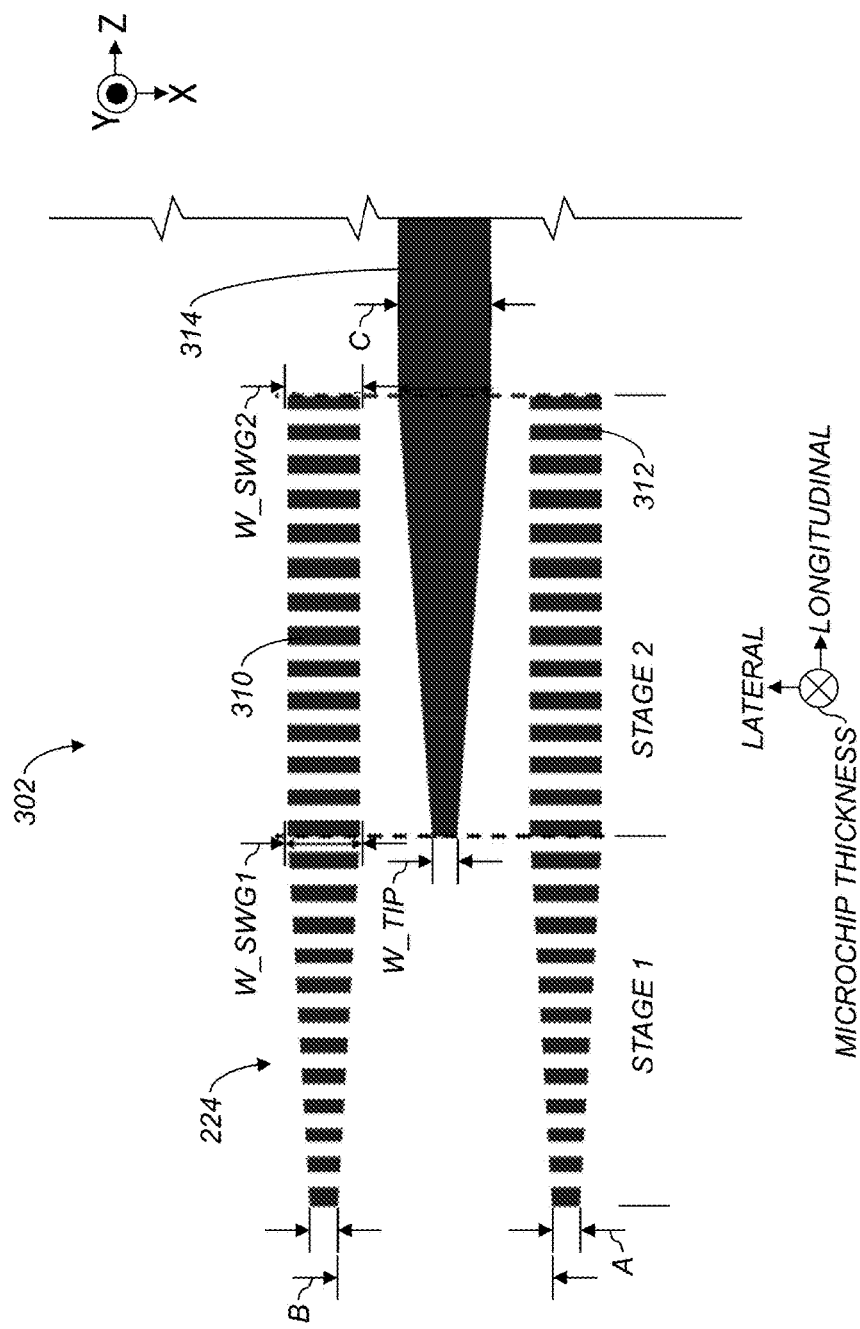
FIG. 4 shows further details of the example coupler of FIG. 3.
Figure 5:
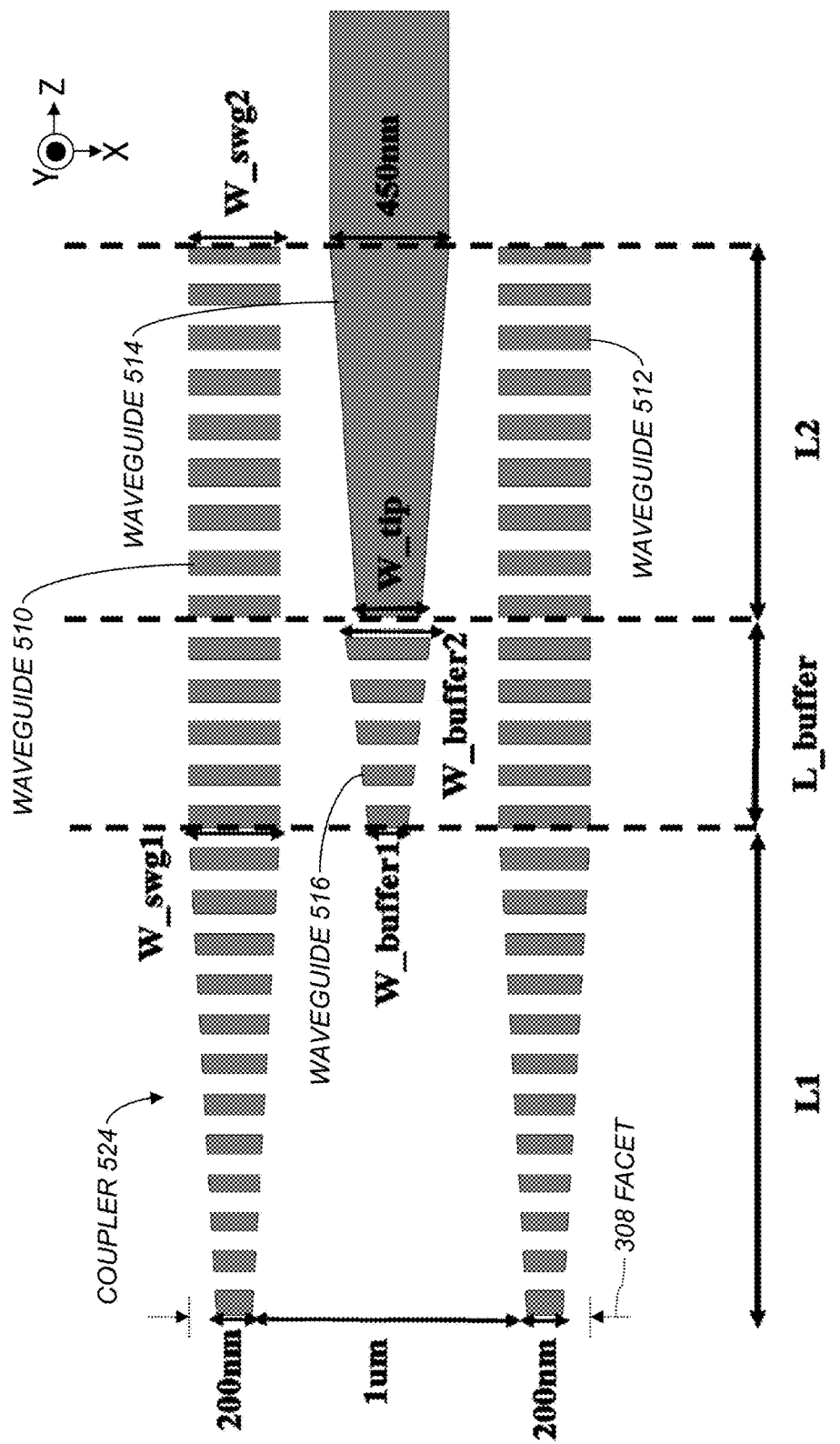
FIG. 5 is a schematic plan of another example coupler.
Figure 9:
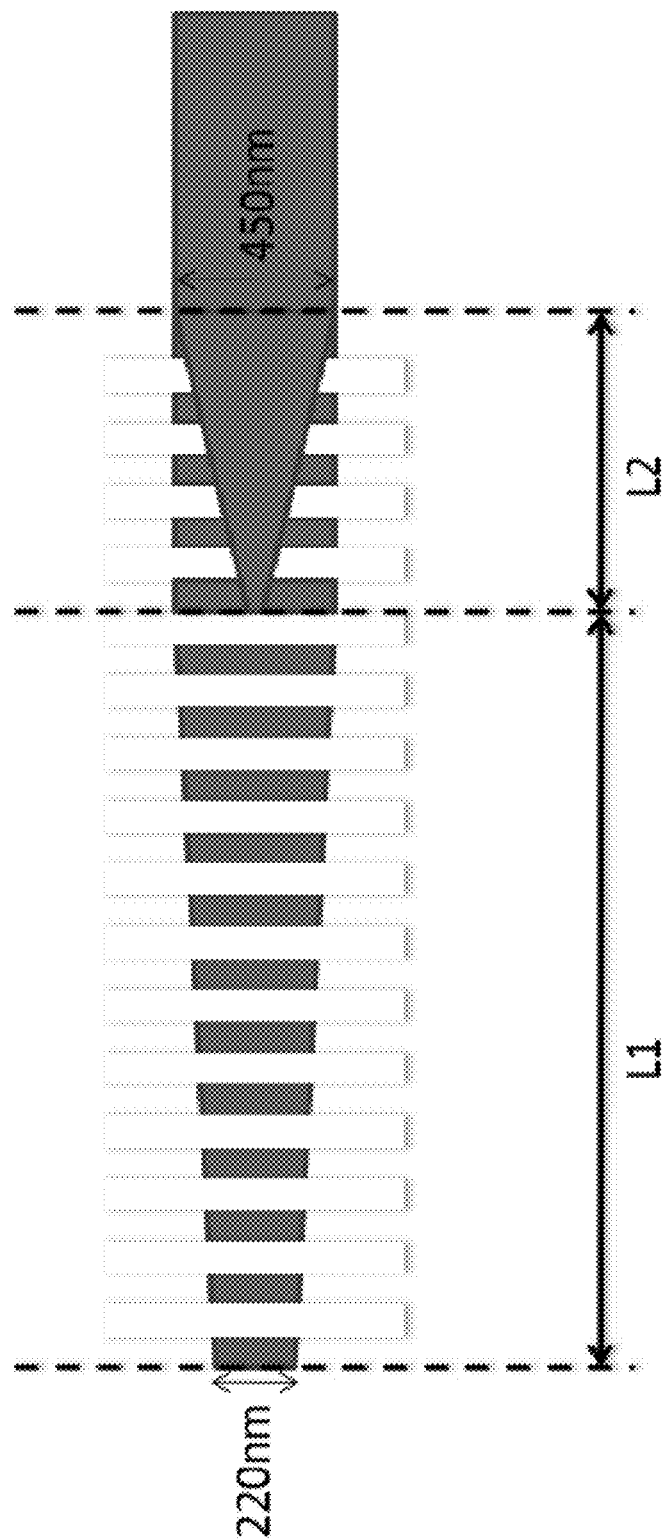
FIG. 9 is a partial schematic plan of an example coupler.
Figure 15:
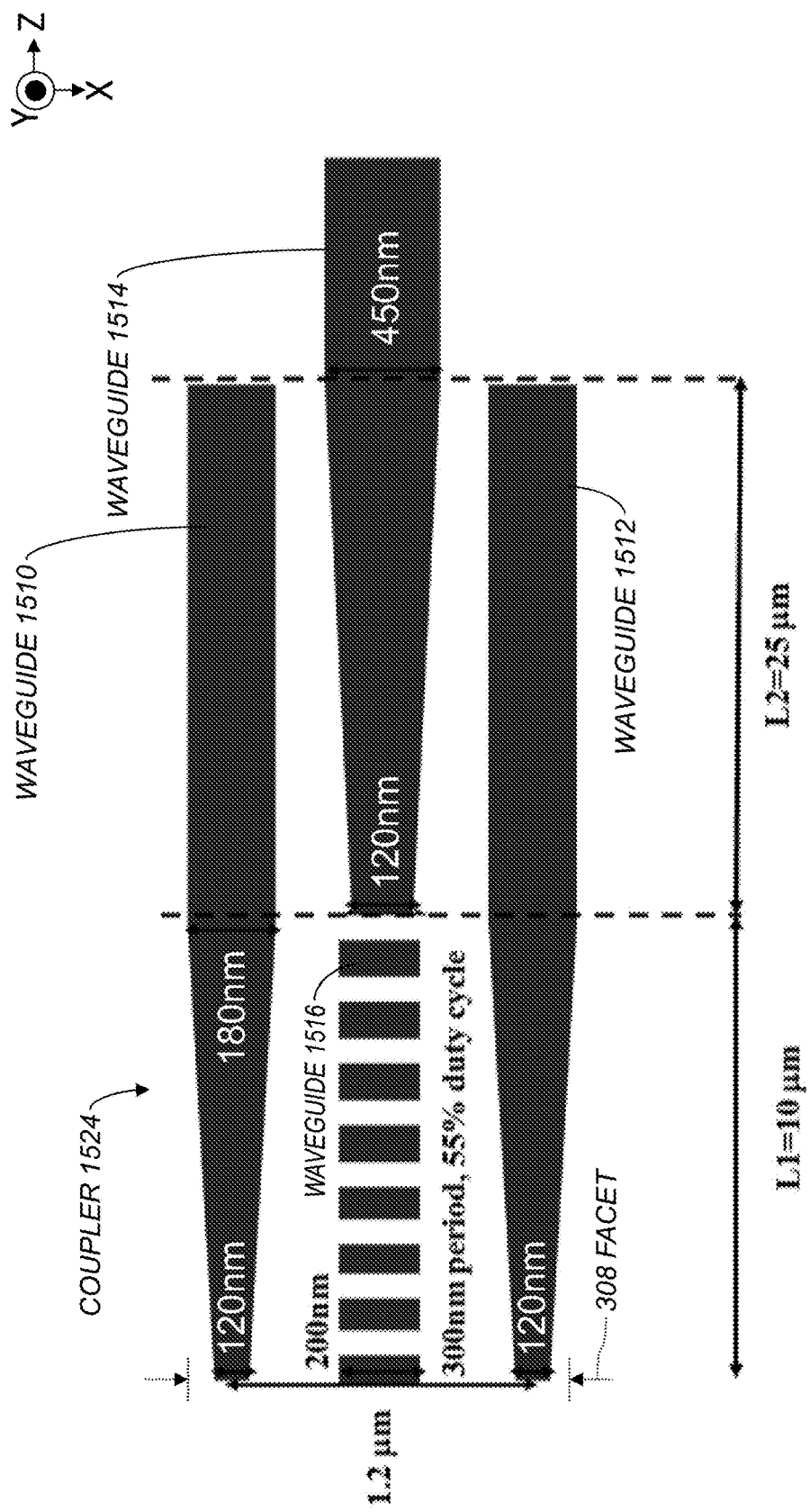
FIG. 15 is a partial schematic plan of an example coupler.

In FIG. 3, waveguide 314 is a buried waveguide. Similarly, each of FIGS. 3-5 shows two exposed waveguides (top and bottom in the figure; laterally adjacent) and one buried waveguide (center). FIGS. 7A, 7B, and 9 show configurations using one exposed waveguide. FIGS. 15-16B show a configuration having three exposed waveguides. As shown in FIG. 16, a waveguide can have spaced-apart dielectric segments arranged substantially along a longitudinal direction of the coupler (segments in the L1 region) and can also have an extended dielectric segment extending substantially along a longitudinal direction of the coupler (tapered segment in the L2 region). In some examples, a waveguide can have spaced-apart dielectric segments but no extended dielectric segment, or an extended dielectric segment but no spaced-apart dielectric segments. A waveguide can have one or more segments.

In some examples, multiple waveguides are used in coupler 224. In some examples, each waveguide has a wider width than 160 nm. In some examples, the refractive indices for Si, $SiO_2$, and SiN are ~3.47, ~1.444, and ~2.0, respectively.

Some examples are broadband. Some examples can be operative across a bandwidth of, e.g., $\lambda$=1500 nm-1600 nm, or $\lambda$=1520 nm-1620 nm. This includes the typical telecommunications range used for optical fibers. Examples can additionally or alternatively be used in the 1310 nm band, other infrared bands, visible bands, ultraviolet bands, or other electromagnetic spectrum bands.

Evanescent coupling shows that the TM mode is more weakly confined than TE, hence coupling is more efficient than TE but also suffers higher leakage. During evolution, mode will experience a leakage peak at position where mode is most efficiently coupled down. Mode coupling process becomes most efficient during narrow range (window) of geometry change, e.g., tip-width change, while leakage peaks exactly at this window. Hence combination of both loss can be mathematically minimized or otherwise reduced at a certain length of waveguides.

Evanescent coupling is most efficient when the mode is aligned with the Si taper structure. Substantially longer taper length may be required for adequate mode conversion if the mode is misaligned with the Si taper than if the mode and the taper are aligned. The larger the position offset between the mode and the Si taper (coupling distance), the lower the evanescent coupling efficiency (since the evanescent field dies off exponentially)

Therefore, in various examples, an intermediate coupling step is added to split one-step evanescent coupling process into two or more steps. A benefit greater than that of the sums of the benefits of the individual steps can be realized due to exponentially growth of evanescent coupling loss with increasing coupling distance.

A CMOS Process can be used to fabricate devices having multiple planarized layers, and provides precise control of film thickness (vertical) and waveguide width (lateral). However, in the back-end-of-line (BEOL) process, films are required to be deposited at low temperatures (<400° C.) to avoid disturbing the dopant profiles. SiN and $SiO_2$ are deposited by PECVD, which usually leads to large variations in refractive indices. However, to increase the optical Mode field diameter (MFD), the refractive indices of the core and cladding need to be small, similar to that of the optical fiber (e.g. <0.02). Small variation of material indices will cause large MFD changes, affecting the coupling efficiency. Some examples use nano tapers and metamaterial tapers, e.g., with MFD<10 um. Some examples use subwavelength gratings (SWGs).

Further Illustrative Examples

Various examples relate to an edge coupler for high NA (numerical aperture) fiber based on SOI substrate. The coupler involves using dual tapered subwavelength grating waveguides (SWGs) to guide optical mode first, between which an inserted inverse taper appears then to draw the optical power in by evanescent coupling. Various examples include a trident-shaped, taper-based fiber-to-chip edge coupler. Various examples use a metamaterial for at least part of the coupler, e.g., for a taper or other portion.

Silicon inverse nano-tapers are promising as fiber-to-chip edge couplers due to the perceived advantages of broadband performance and the ease of on-chip integration. An example prior Si inverse taper is shown in FIG. 1A and FIG. 1B, where Si taper 3 is embedded in $SiO_2$ 2. The top view in FIG. 1B shows that taper width expands linearly from tip width $W_{tip}$ up to $W_{wg}$ (usually 450 nm for single mode Si waveguide with H=220 nm) in a length of Ltaper. For taper fabricated on a SOI wafer, there is always a buried oxide (BOX) layer to avoid power leakage from waveguide 4 to Si substrate 1. Since most commercially available BOX has thickness 2-3 μm, or less than 3 micrometers, hence this conventional inverse taper does not suit for standard cleaved fiber (SMF-28) with mode field diameter (MFD) around 10 μm. As a result, much of the mode couples to the silicon substrate and is lost. A well established solution is to used lensed fiber to focus beam at taper tip such that input mode with strongly reduced size no longer suffer from leakage. However the lensed fiber approach is not favored by the industry due to its extreme complexity at fiber alignment, its unreliability, and the increased costs.

Another technique is to splice the SMF-28 with high NA fiber, which leads to trivial splicing loss under special fiber splicing program. High NA fiber with flat "head" can directly touch the chip just as SMF-28 does, although misalignment tolerance is sacrificed. Compared with lensed fiber, high-NA flat fiber offers more reliable packaging and expanded alignment tolerance, although sometimes at an increased input MFD. This increased input MFD may reduce edge coupler efficiency. Therefore, various embodiments herein permit designing couplers for specific MFDs.

In other prior schemes, instead of using single inverse taper, a "trident spot size converter" is used to render loss within 2 dB/facet. The input beam is initially coupled to the super-mode, then is transited into the tapered core which interacts with the beam as the beam propagates away from the facet, into the structure.

In some examples, in addition to a strip waveguide taper, an SWG is introduced into the edge coupler, e.g., for C band or O band uses. The SWG offers one additional degree of freedom (refractive index) of the facet design to permit matching the input mode profile. The tip geometry at the facet can be square to ensure the same mode area of $TE_{00}$ and $TM_{00}$ supported by the tip, and the mode size can be adjusted by tuning the grating duty cycle (equivalent refractive index). Then input beam of both polarizations can couple into the SWG as a form of a Bloch mode, which is subsequently converted to strip mode by a hybrid converter region. However, some prior schemes for SWGs involve removing portions of the silicon substrate, increasing production cost and reducing compatibility with conventional wafer processes. Moreover, removing portions of the substrate can mechanically weaken the wafers, reducing manufacturability and yield.

Various examples include an edge coupler on SOI platform that incorporates an SWG into a trident shaped mode size converter. In an example using SWGs for both exposed waveguides of the trident, the mode area of both polarizations can be adjusted simultaneously by tuning the duty cycle of the SWGs. This is a property that some prior schemes lack. In addition, various examples omit a Bloch-to-strip mode converter, which increases coupling loss in some prior schemes. In some examples, the input beam will first propagate as a Bloch super-mode in the two exposed waveguides (tips), then be evanescently coupled into the strip inverse taper (buried waveguide) in the middle of the trident. During this evanescent coupling process, Bloch-to-strip mode conversion takes place without using or requiring a dedicated Bloch-to-strip converter.

A related application, U.S. Ser. No. 62/383,145, incorporated herein by reference in its entirety, describes a coupler useful for various fiber applications. Some examples herein provide a structure useful with single-layer waveguides. Various examples use narrower-MFD fiber. Some techniques use 9 μm MFD single-mode fiber.

Some examples herein are configured to convey energy to, from, or using a 4 μm-MFD single-mode fiber. Some examples are configured to interface with high-NA fiber, e.g., spliced to a conventional fiber. Using high-NA fibers providing relatively small MFDs permits using a single-layer coupler while maintaining acceptable levels of leakage of the mode to the silicon substrate, and while maintaining structural integrity and manufacturability of the device. Some examples are more compact than prior techniques.

Some examples provide at least one of, or any combination of any of one or more of, the following technical effects, compared to prior schemes: an increased amount of polarization-independence; a smaller coupler; usability with flat-faced fiber (e.g., affixed to SOI device using index-matching fluid); usability with lensed fiber; usability with high-NA fiber; increased yield or mechanical stability of a device including this coupler; compatibility with SiN substrates; or compatibility with SOI substrates.

Some embodiments involve SWG tips. The dimensions and relative positions of the dual tips (e.g., 220 nm width with 1 μm gap) can be selected so that the fundamental TE and TM modes will be substantially equally-sized. In a simulated example, at 50% SWG duty cycle, which equivalents to material index of 2.457 (average of $SiO_2$ and Si), provides a $TE_{00}$ and $TM_{00}$ of substantially equal mode area (8.93279 μm$^2$ for $TE_{00}$ and 9.02981 μm$^2$ for $TM_{00}$). The modes can provide a 94% overlap to a Gaussian mode with 4 μm MFD. With commercially available high NA fiber, e.g., NUFERN UHNA3 (e.g., 4 μm MFD at 1550 nm wavelength) and index-matching fluid, 94% of the input beam can couple into the coupler device. In some examples using SWGs, the mode size can be maintained consistent for $TE_{00}$ and $TM_{00}$. Unlike solid-core dual-taper wavelengths, some examples using SWGs provide polarization-independent mode shapes.

FIG. 4 shows further examples of a structure of an example design such as that shown in FIG. 3. Once the input beam is coupled to the dual SWG tips, the weakly guided supermode will start propagating with nontrivial leakage. The width of the SWG at stage 1 gradually expands to improve confinement. However the SWG cannot be too wide here since otherwise Bloch mode ceases propagating along SWG once Neff is high enough. For example, 400 nm is an example of W_swg1 while W_swg2 can (but is not required to) have a similar value. In some examples, dimension A is 200 nm. In some examples, dimension B is 1 μm. In some examples, dimension C is 450 nm.

In some examples, a solid-core dual-taper structure can form a single mode, or "supermode," in which the left and right tapers are not readily distinguishable. In some examples, a Bloch mode propagates along a SWG waveguide (see FIG. 6).

Some examples include SWG waveguides and solid waveguides configured to effectively couple TE modes. Less length is required in Stage 2 for TM coupling than for TE because TM is more weakly guided. (e.g., a length of 30 nm vs. 50 nm). In some examples, the tip width at the Stage 1/Stage 2 junction is selected to reduce disruption in mode propagation, e.g., TM mode propagation. Examples are described herein with reference to field-monitor simulation.

Once the supermode reaches the end of Stage 1, it encounters a buried waveguide having a linear inverse taper shape. This waveguide 314 completes the mode conversion. Mode power at the two SWGs 310, 312 will evanescently couple to the inverse taper 314 in the middle. The Bloch mode is directly converted to a strip mode during this process. In this way, the supermode being carried on the SWG waveguides 310, 312 is converted to a single mode in the central Si waveguide 314. Compared to some conventional meta-material edge couplers, some examples herein remove a separate Bloch-to-strip mode converter while retaining the function thereof.

The tip width of inverse taper is most likely the minimum feature size and can be, e.g., substantially equal to the minimum feature size, or otherwise smaller than W_SWG1, in order to reduce mode mismatch loss. With dual strip waveguides 310, 312 having an effective index of 2.457, equivalent Bloch supermode can be calculated. Compared with the mode profile at inverse taper 314 tip, mode mismatch loss can be found. In a simulated example, TM is more sensitive to mode mismatch compared with TE as tip width increases. This is due to the fact that TE mode at the end of Stage 1 is more confined than the TM mode. For example, 120 nm can be used as a minimum linewidth under deep UV optical lithography, while 120 nm tip width will result in 0.05 dB TE loss and 0.25 dB TM loss.

The whole structure with both 80 nm and 120 nm minimum linewidth were simulated. In a simulated example, with 3 µm BOX and total device length of 100 µm, Hatband TE transmission around 89% can be obtained even for 120 nm tip width. TM transmission however decreases from 87% to 84% due to increased mode mismatch loss.

FIG. 5 shows one embodiment of the design that a short SWG buffer stage can effectively reduce the equivalent refractive index hence mode mismatch. With increasing minimum feature size, mode mismatch can be alleviated by deploying a short tapered SWG as buffering region.

The transmission spectra for example devices with and without SWG buffers were simulated. Given L_buffer=5 µm, W_buffer1=120 nm & W_buffer2=180 nm, simulated with an SWG duty cycle increment from 40% to 50%, the TM mode mismatch loss was restored to between 87% and 88% for TM, while still maintaining >88% for TE over the range 1500 nm-1600 nm.

FIG. 5 shows examples of a fiber coupler 524 for a fiber having a relatively small MFD. Some examples use two (or ≥1 or >1) discontinuous (SWG) tips 510, 512 at the fiber interface (facet 308). As the mode progresses into the coupler 224 (left to right in the figure), the tips 510, 512 (SWGs) increase in width. After the stage having length L2, the energy is carried by the solid-core Si waveguide 514, e.g., having a width of 450 nm. In some examples, a buffer tip waveguide 516 is also used, as shown. In the illustrated example, all four waveguides 510, 512, 514, and 516 are arranged in a common layer. Some examples of couplers herein are more compact than prior techniques. Some examples are usable with thinner wafers than other tip types. In some examples, the thickness of the waveguides 510-516 is about 220 nm. As the width of an SWG increases beyond its thickness, TM becomes less weakly guided. This permits transferring TM energy to the central, solid waveguide.

In some examples, a tip width of zero would be preferable. However, some fabrication techniques have a minimum feature size. In some examples, instead of a zero-width tip, a buffer waveguide 516 is added to improve TM performance. In some examples (e.g., that shown), a longitudinal axis of waveguide 516 substantially coincides with a longitudinal axis of waveguide 514. For example, when looking from the facet in the +Z direction, waveguides 514 and 516 may share or substantially share a common centerline.

Some embodiments are designed for 3 µm BOX thickness wafer; other embodiments use 2 µm BOX. Given 4 µm input MFD, nontrivial leakage can be induced. In a simulated example, the spectra of coupling loss were determined for devices with both 2 µm and 3 µm BOX thickness. Results show longer wavelength renders more leakage while TM suffers much higher leakage loss than TE. With 2 µm BOX, TM loss around 1.2 dB-1.6 dB and TE loss around 0.8 dB can be obtained. However with sidewall roughness included, TE loss may be significantly higher than without roughness, while TM loss can be almost unaffected.

Various examples are not restricted to the C band (e.g., 1530-1565 nm). The purposed structure can also be used for the O band (e.g., 1260-1360 nm) if properly designed. In the O band, UHNA3 MFD reduces to 3.3 µm and additionally Si layer thickness can be reduced in order to reduce Neff. One embodiment uses 170 nm thickness with 170 nm tip width of the dual SWG waveguides (e.g., waveguides 310 and 312), and a 300 nm period Λ (discussed below). The SWG width linearly expands to 300 nm with duty cycle decrement from 60% to 50%. With the rest of the parameters the same as for an example design at C band, Hatband TM loss below 1.2 dB and TE loss below 0.6 dB can be obtained. Since input MFD is smaller, TM leakage at O band becomes less severe than design at C band.

In some examples using an Si layer thickness of 220 nm, the minimum feature size is insufficient, smaller a grating period is required at O band. Some examples use dual SWG tips (waveguides 310, 312) having widths expanding from 200 nm to 270 nm, and a 200 nm period, the duty cycle increasing from 42% to 50% over the length of the tapered section (L1). With 10 µm long buffered SWG and 45 µm long inverse taper, the O band coupling loss can reach below 1.1 dB even for 2 µm BOX thickness.

Various examples can also be applied for SMF-28 fiber input. A simulation was performed of the MFD for dual tips with 220 nm by 220 nm tip cross-section (as FIG. 6B) with 1 µm lateral spacing, sweeping the refractive index. With index around 1.9 (duty cycle of 25%), the mode size matches well with that of SMF-28 mode. Still since mode radius is far beyond BOX thickness, some examples replace the Si substrate with index matching material. In some examples having a large MFD, TE and TM mode areas will be very different in solid tips. Therefore Bloch supermode can be used. In some examples, solid tips are not used at the fiber interface for MFD≳~4 µm. For lensed fiber, SWG tips can provide balance to a dual solid-tip design. Tuning $n_{eff}$ can provide a more balanced mode shape with polarization independence. In some examples, both solid and SWG tips are used at the fiber interface.

Still Further Illustrative Examples

Various examples herein related to a meta-material edge coupler on an SOI platform. Conventional SOI inverse tapers (e.g., FIGS. 1A and 1B) are designed with a tip width which then gradually expands to a single-mode waveguide width (450 nm for example). The tip width is designed to support the fundamental mode with mode overlap to the input beam. As the beam (a dislocated edge mode) propagates further along the taper, mode size is gradually reduced and eventually the mode is drawn into Si core, transformed into a well guided strip waveguide mode.

Some prior schemes require that the proper tip width is chosen, but this can be restricted given specific SOI wafer. For instance, on SOI wafer with 220 nm Si thickness, the best overlap to a Gaussian mode with 2.5 µm MFD occurs at 180 nm for TE and 160 nm for TM. An edge mode without polarization dependence can only be supported by a square tip (width=thickness=220 nm) which shows however poor overlap as mode is too well confined (mode area too small to match 2.5 µm MFD).

The birefringence effect (TE and TM mode area difference) becomes even more significant when trying to match large input MFD beam. As a solution, in some examples, meta-material edge couplers are purposed to eliminate birefringence by using a square tip. Then the mode size of both polarizations can be equally adjusted by changing the duty cycle of the subwavelength grating waveguide (SWG).

Input beam (especially with large MFD) can couple to Bloch mode of SWG without polarization dependence. The Bloch mode however needs to be converted to a strip waveguide mode as output. Some prior schemes use a hybrid taper to convert the mode, although it will cause some losses as well as high resolution E-beam complexity.

Figure 6A:
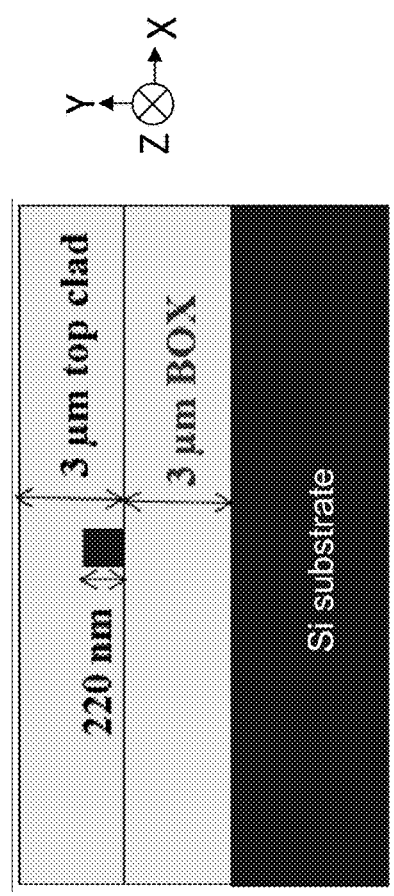
FIG. 6A is a front view of an example coupler.
Figure 6C:
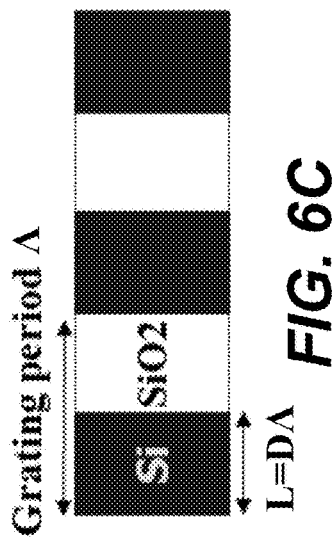
FIG. 6C is a partial schematic plan of the example coupler of FIG. 6A.
Figure 6B:
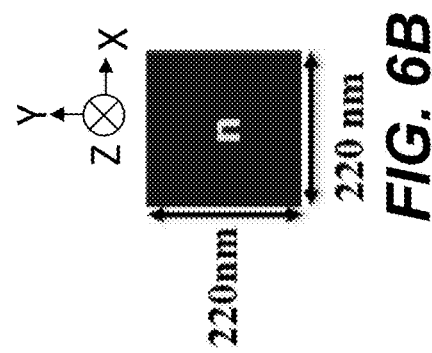
FIG. 6B is a zoomed-in front view of the example coupler of FIG. 6A.

FIGS. 6A, 6B, and 6C show an example meta-material ("Uni-Meta") edge coupler. Shown is an example SWG design at and extending away from the edge (facet). FIG. 6A shows a front view, FIG. 6B shows a zoomed-in front view, and FIG. 6C shows a top view. In the illustrated example, the tip width is equal in width and height (here, 220 nm) to reduce polarization sensitivity. Therefore, FIG. 6C can additionally or alternatively represent a side view. In FIG. 6C, "D" represents the duty cycle as a percentage of the grating period $\Lambda$.

The example device is fabricated on a 220 nm Si thickness SOI wafer with 3 μm BOX and top cladding. The tip is designed to support a fundamental mode that substantially or sufficiently overlaps with a Gaussian mode having a 4 μm MFD (e.g., from high-NA flat fiber). To preserve polarization-insensitivity, the tip is substantially square in the XY plane. A simulation can be performed to determine mode size as a function of bulk refractive index, e.g., for a solid waveguide having the same tip and extending away from the facet (+Z) continuously. In an example that was simulated, an index of 2.5 was determined to provide an effective mode size to overlap with an input mode. The input mode compared to the simulation results was a Gaussian mode with 4 μm MFD in the air. Mode overlap including the Fresnel's reflection was simulated to be up to 92% for TM and up to 94% for TE, for the simulated refractive index of 2.5. In some examples, the bulk refractive index determined based on the simulation is 3.

The duty cycle D, which is a fraction of $\Lambda$, can then be determined based on the refractive index from simulation. The weighted-average index of the SWG can be computed as $$n_{Si} \times D + n_{SiO2} \times (1-D), 0 < D < 1$$

and the value of D can be selected so that this weighted-average index matches the bulk refractive index determined from the simulation. In an example that was simulated, bulk refractive index $n_{eff}=2.5$ can be realized at duty cycle D=53%=3.44*X+1.444*(1−X).

In some examples, e.g., FIG. 6C, the spaced-apart segments permit Bloch-mode propagation of light in a predetermined wavelength range, e.g., centered around a Bragg wavelength $\lambda_{bragg}$. In various examples of Bloch-mode propagation, the grating period $\Lambda$ of the grating can be selected so that the SWG allows beam propagation. In some examples, the SWG can operate in the subwavelength regime for Bloch mode propagation. This requires that the Bragg wavelength ($\lambda_{bragg}=2 \times n_{eff} \times \Lambda$), at which the SWG reflects light, be different from the desired operation wavelength. In some examples, for operation wavelength $\lambda$, e.g., between 1500 nm and 1600 nm:

$$\Lambda << \lambda/(2 \times n_{eff}) \text{ or } \Lambda >> \lambda/(2 \times n_{eff})$$

where $n_{eff}$ is the highest mode index of Bloch-mode propagation of light in the SWG. For example, if the Bloch mode index can be as high as 2 for some choice of $\lambda$, $\Lambda < 375$ nm can be used ($2 \times 3 \times 375$ nm=2250 nm>>1550 nm). Various examples use a 300 nm grating period to ensure operation regime far away from Bragg reflection zone. In some examples in which the Bloch mode index can be as high as 3. $\Lambda$=300 nm can be used, since $2 \times 3 \times 300$ nm=1800 nm>>1550 nm, so the SWG will transmit light at 1550 nm.

Once D and $\Lambda$ have been determined, the length L of each segment in the Z direction can be determined as L=D$\Lambda$. A mask pattern of the SWG can then be determined based at least in part on any two of D, L, and $\Lambda$, and that mask pattern can be used in producing the SWG on an SOI wafer.

In some examples of meta-material edge couplers, TE mode will eventually suffer more disruption along propagation than TM if TE reaches higher $n_{eff}$ than TM. In some examples, shorter operation wavelengths will be more closely located to the Bragg reflection regime, hence even smaller grating periods may be required (e.g., for O band application).

FIGS. 7A and 7B show examples of simulations. Numerical simulation of the physical structure can be calculate with 3D FDTD (Finite-Difference Time-Domain numerical modeling), which is the most reliable but also computation consuming. EME (Eigenmode Expansion modeling) method although much more efficient, cannot directly be used on SWG since no eigen-mode can be found at "void trenches". Nonetheless an equivalent structure can be calculated where the stage 1 SWG assumes n=2.5 uniformly. The stage 2 is the hybrid taper that SWG taper is overlapped with: an inverse taper to gradually match the index to Si. FIG. 7A depicts a top view of a simulated structure in Lumerical FDTD. FIG. 7B depicts a top view of an equivalent structure in the Lumerical EME solver's refractive index monitor, with refractive indices generally increasing left-to-right in the L2 section. FIGS. 7A and 7B are examples of prior schemes.

A simulation was performed of 3D EME calculated mode conversion efficiency with L1=50 μm while scanning L2. The EME calculation shows the upper limit of the mode conversion efficiency (mode transition loss only). Without considering the tip coupling loss as well as sidewall scattering and leakage, EME can still give an approximation of the taper length required for a desired level of performance. The simulation showed that, while L1=50 μm, scanning L2 was not going to significantly improve the performance, which indicates even longer L1 may be required.

An FDTD simulations of 3D FDTD calculated coupler loss with 2 μm and 3 μm BOX thickness were performed. L1=50 μm & L2=20 μm were chosen given EME performance about 0.6 dB loss as 92% tip coupling efficiency is considered. This is consistent with FDTD results for 3 μm BOX SOI device. For 2 μm BOX however, TM expects 1 dB higher loss due to increased leakage while TE loss is merely increased by 0.3 dB.

A simulation of 3D FDTD calculated coupler loss with 3 μm BOX thickness and sidewall roughness was performed. Devices with sidewall roughness were also investigated in FDTD where 10 nm RMS amplitude roughness is added on sidewall only. In some examples, TE suffers higher scattering loss than TM. Simulations were performed, and show that, for the same device on 3 μm BOX, total loss is increased by 0.5 dB for TE and 0.1 dB for TM when 10 nm sidewall roughness is added. The TE input |E| spreads out when sidewall roughness is added.

Figure 8:
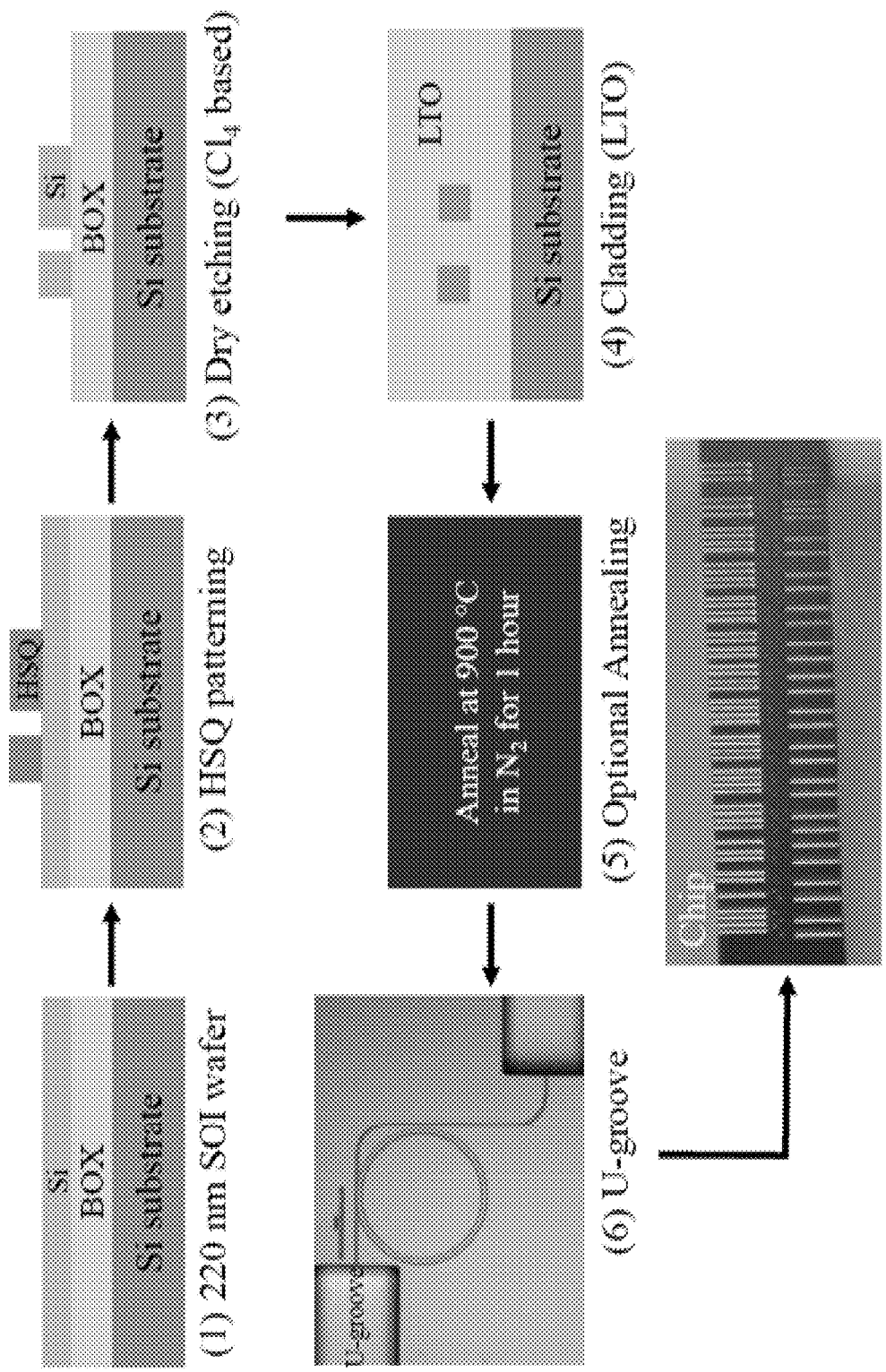
FIG. 8 shows example operations in fabrication of a coupler.

FIG. 8 shows example operations for fabricating an edge coupler on an SOI platform. Initially with E-beam writing and Panasonic etching, Si structure is defined. Then the chip is oxidized by LTO, e.g., substantially all the way towards the top cladding thickness. If the chip is going to have U-groove (used in some embodiments; omitted in some embodiments), then optical lithography and etching is performed to define the groove region. Finally etch definition is done by optical lithography and deep etching.

FIG. 9 shows an example design of a meta-material taper with 300 nm period and 53% duty cycle. To fabricate the hybrid taper section, E-beam writing with proximity effect correction (PEC) can be applied. A fabricated taper was imaged using SEM and was observed to be fabricated with decent resolution but some lateral offset (around 20 nm). Some examples of this design are used by prior schemes.

Figure 10A:
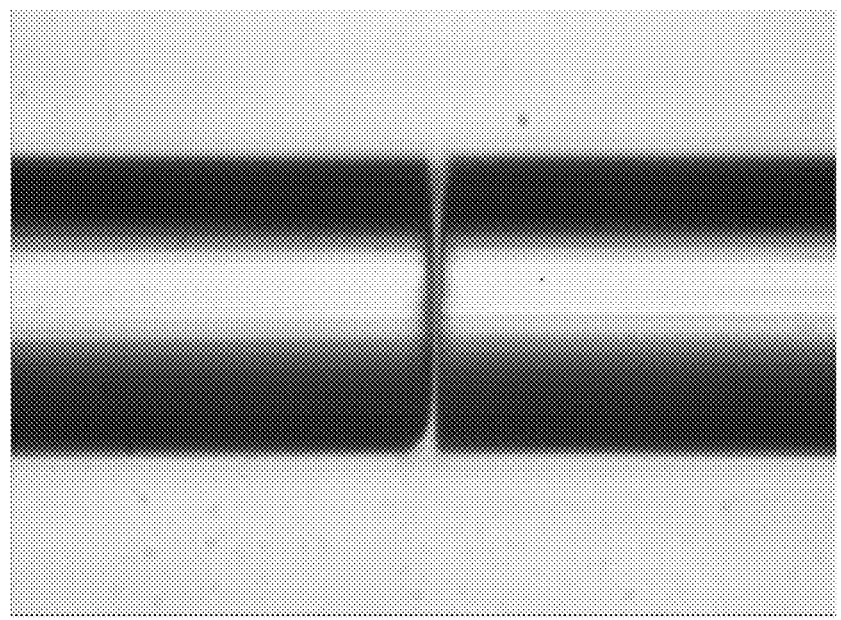
FIG. 10A is a graphical representation of an image of butt-spliced fibers.
Figure 10B:
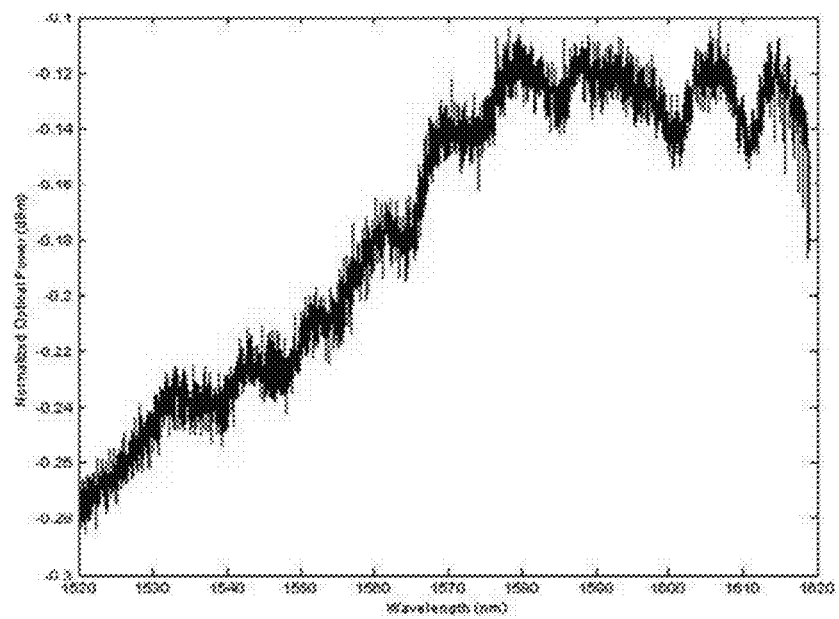
FIG. 10B is a graph showing a measured power spectrum of loss at the splice in FIG. 10A.

FIGS. 10A and 10B show examples of splicing tests. The chip measurement starts from characterizing the input power from high NA flat fiber. UHNA4 from Nufern used which yields 4 μm MFD at C band and 3.3 μm MFD at O band. Although Nufern claimed 0.2 dB/splicing can be obtained when UHNA4 sliced to SMF28 given specific splicer is used. With a tested splicer in the lab, splicing loss can be measured by the power drop from input through Spliced SMF28/UHNA4/SMF28.

FIG. 10A shows a setup of a Nufern fiber-to-fiber test. FIG. 10B shows a measured power spectrum as a function of wavelength. Without Nufern fiber, system input is measured at 3.61 dBm while with SMF28-Nufern-SMF28, power transmission dropped to 0.76 dBm. This gives on average 1.42 dB per splicing. Splicing loss is not a constant hence each time when using new Nufern fibers, splicing loss is characterized (mostly below 2 dB). Then the Nufern fiber is cleaved (from the middle) into two pieces as input and output fiber. Then two fiber are used for fiber-to-fiber test to characterize the input power level out of cleaved Nufern fiber. As shown in FIG. 10B, input power dropped to around −2 dB where the cleavage caused 1 dB power loss. Various examples of couplers described herein can be used with any fiber-splicing or other techniques for reducing the MFD in the fiber. Various examples can be used with commercially-available high-NA fibers.

Figure 11:
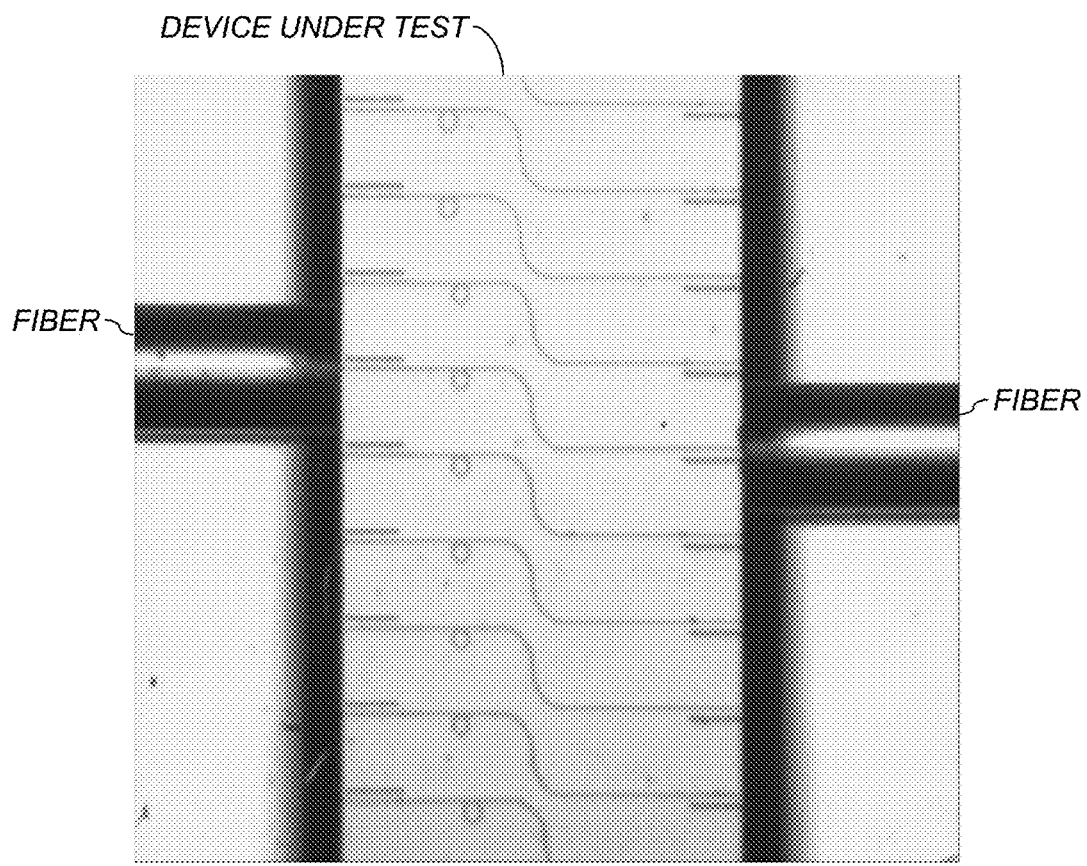
FIG. 11 is a graphical representation of an image of an example device including optical couplers, in a test configuration being used to couple two optical fibers.

FIG. 11 shows an example chip under test. The chip is designed with edge couplers on both edges, connected to strip waveguides and S bends in the middle. The chip is designed without U-grooves such that during fiber coupling the correct height is found, and only translational movement is required to find the coupling of the next device. In a tested example, the measured TE output power spectrum exhibited rapid oscillation as a function of wavelength.

A measured chip from the first batch (the process flow described below, FIG. 13A) did not yield satisfies results. In a tested configuration, TE polarization beam showed strong (about 8 dB swing) and rapid power oscillation while TM shows weaker oscillation. Chips having 300 nm and 350 nm periods were also tested, and exhibited the ripples (although at reduced magnitude). Nonetheless the upper envelope was located at −5 dBm, which indicates about 2.5 dB coupler loss per facet. With conventional process flow, the LTO process may not cover all small trenches of SWG, leading to random air bubbles in the gaps. To fix the problem the process flow is modified such that before LTO, thin layer HSQ spinning and annealing is done to cover the air gaps at Si layer.

Figure 12A:
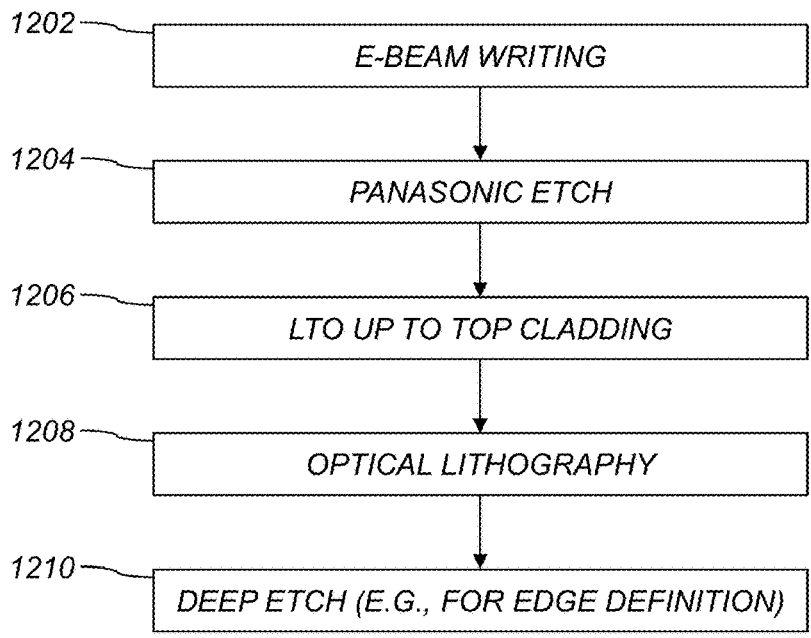
FIG. 12A is a flowchart of an example coupler-fabrication process.
Figure 12B:
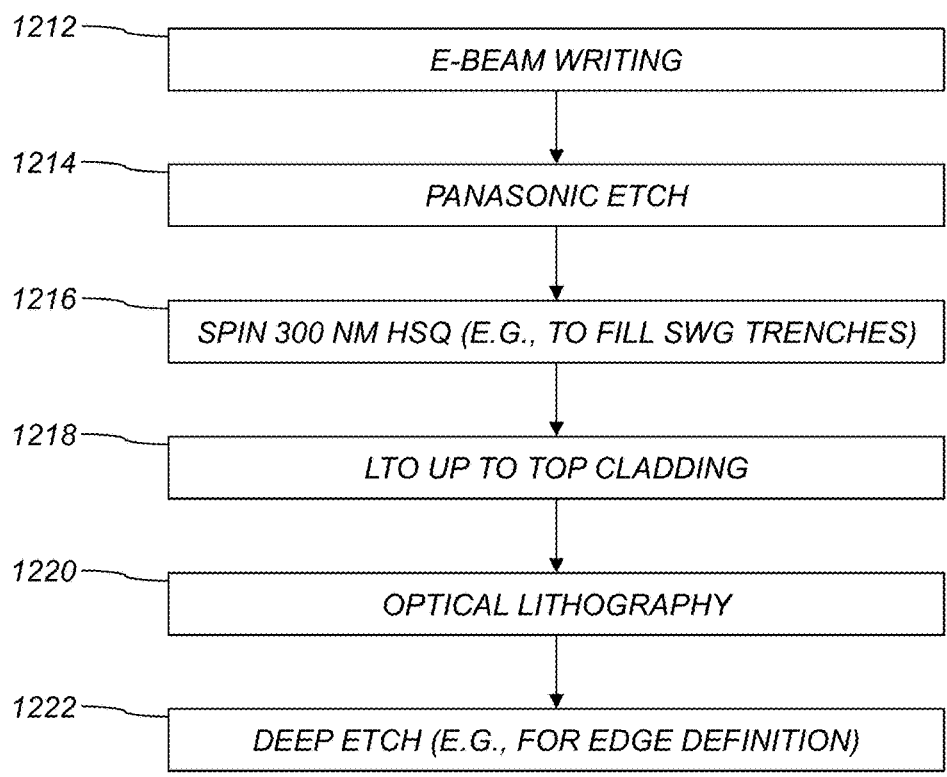
FIG. 12B is a flowchart of another example coupler-fabrication process.

FIGS. 12A and 12B show example processes for fabricating devices such as that depicted in FIG. 11. FIG. 12A shows a conventional process flow; FIG. 12B shows a process flow according to various embodiments herein (e.g., FIG. 8).

A chip was fabricated via a process flow such as that shown in FIG. 12B, and was tested with the same setup discussed above (FIG. 11). The rapid oscillation was not exhibited, for both polarizations, and flatband transmission was obtained. Dips and spikes in the measured data were the wavelength of ring resonance. The ring can be designed with small radius with 400 nm gap, which allows TM to couple through but prohibit TE coupling. However on the measured chips 20 μm radius ring is used, which allows both polarization to couple. Measurement shows less than 3 dB/facet loss can be obtained for both TE and TM polarization. As a comparison with linear inverse tapers, uni-meta tapers shows about 0.8 dB less coupling loss.

Various examples relate to a meta-trident edge coupler, e.g., for Nufern fiber. Conventional meta-material indeed shows superior performance to linear inverse taper. Nonetheless power loss at junction between SWG and hybrid taper becomes inevitable. Higher-performance Bloch-to-strip mode conversion is provided by various examples. The trident edge coupler can be implemented using SWGs, in some examples. Conventional trident edge coupler use two tips that trap the input beam in a form of strip supermode then converted into strip mode at the inverse taper in the middle. Similar idea can still apply, where dual SWG trap the mode in the form of Bloch supermode then couple to strip mode at inverse taper by evanescent coupling. As long as the tip width of inverse taper between dual SWG is narrow enough, no mode mismatch loss will be incurred. Meta-trident design not only evades the inefficient the Bloch-to-strip mode conversion process, but also remove the necessity to fabricate high resolution hybrid taper section. Compared with conventional trident edge coupler, meta-trident coupler also provides the same advantage that input mode size of both TE and TM can be equally scaled by adjusting SWG duty cycle.

Referring back to FIG. 4, there is shown an example design according to various embodiments herein. The first stage of meta-trident coupler is dual SWG tapers 310, 312 that trap input beam in the form of Bloch supermode. The width expansion of SWG at stage 1 is for purpose of increase mode confinement (reduce leakage). At the end of stage 1, an inverse taper 314 appears and gradually draws Bloch mode power on dual SWG 310, 312 into the middle strip waveguide 314.

The design phase starts at the dual SWG at edges. With tip width near 220 nm and various gap size, polarization independent mode area can be found, e.g., as discussed herein with reference to FIGS. 6A-6C. In a simulated example, the TE and TM curve almost overlap, indicating no birefringence for the Bloch supermode. In some examples, the supermode power distribution makes the optimized overlap occur at smaller MFD than might be expected. Here n=2.457 (compared to expected n=2.3) is found with overlaps 95% to Gaussian mode with 4 μm MFD, which is 50% duty cycle. Other duty cycles can be used in other configurations. In some examples, 200 nm wide dual SWG spaced laterally by 1 μm shows equal mode area of $TE_{00}$ and $TM_{00}$. As comparison, in prior schemes using the refractive index of solid Si, polarization independence can no longer be obtained given various tip width and gap sizes.

Equivalent n can be determined based on duty cycle of SWG. In a simulated example, n increases as duty cycle increases and MFD decreases. n=2.457 can be used to match with 4 μm MFD. In some examples, the MFD of the structure can be chosen empirically to be slightly smaller than the fiber MFD. This can increase the coupling given a Gaussian input profile. In some examples, a structure can be selected (e.g., lengths L and gaps Λ-L). Then, an n-equivalent can be determined, then a duty cycle can be determined to provide that n-equivalent value. See FIGS. 6A-6C.

Simulations were performed of |E| of: (a) $TE_{00}$ with $n_{strip}$=2.457 (modal area 8.93279 µm²); (b) $TM_{00}$ with $n_{strip}$=2.457 (9.0298 µm²); (c) $TE_{00}$ with $n_{strip}=n_{si}$ (13.0358 µm²); and (d) $TM_{00}$ with $n_{strip}=n_{si}$ (3.63468 µm²).

Figure 13A:
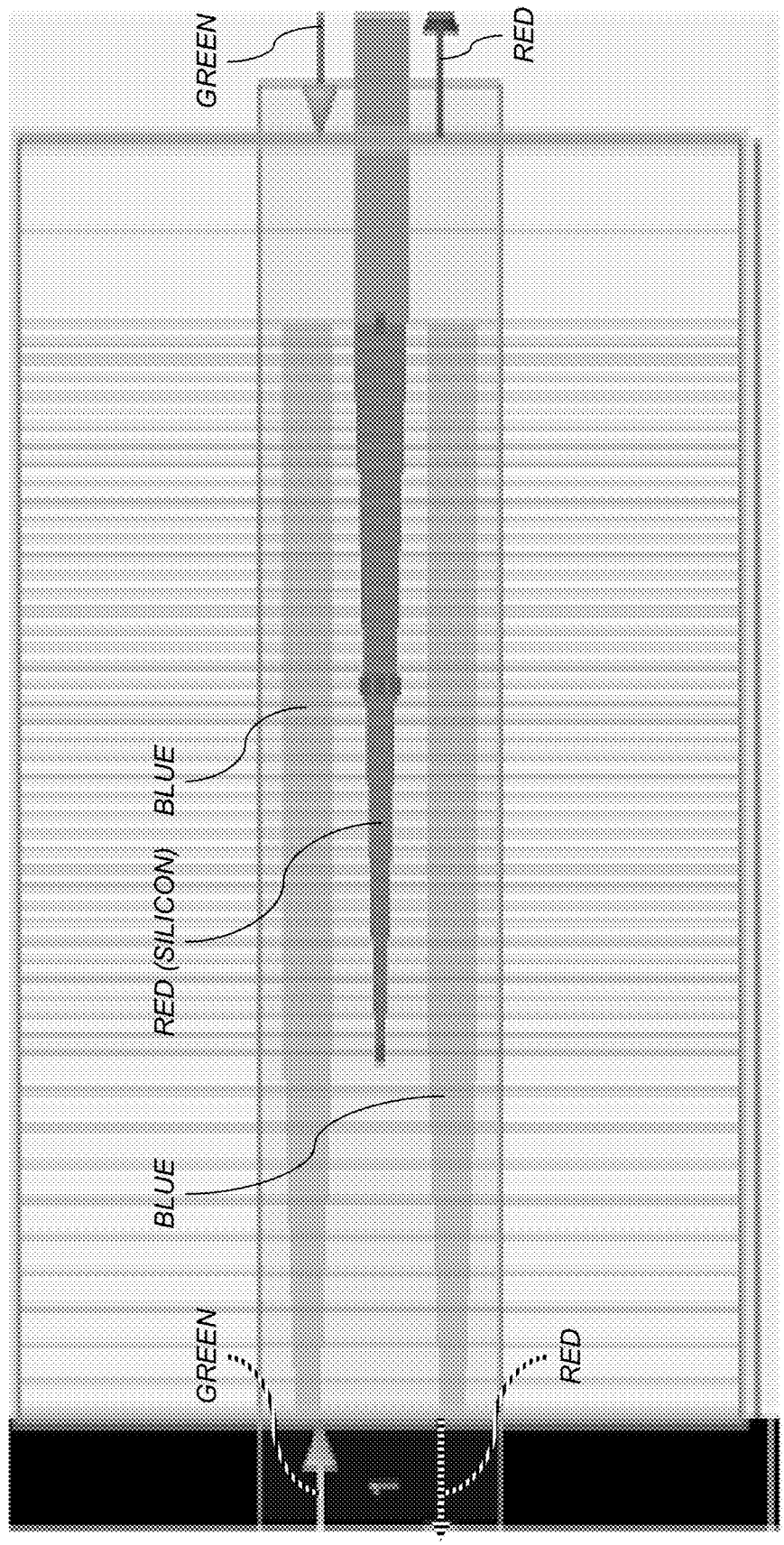
FIG. 13A shows a top view of a simulated structure.

FIG. 13A shows an example of an equivalent structure in the Lumerical EME solver. To get a rough estimate of the required taper length, EME simulation is applied on the equivalent structure where dual SWGs 310, 312 are represented by solid strip waveguides with $n_{strip}$=2.457. The input mode is set as supermode of dual waveguide and EME simulation is scanned for various L1 and L2. In some examples, TM is more efficient than TE during evanescent coupling.

Figure 13B:
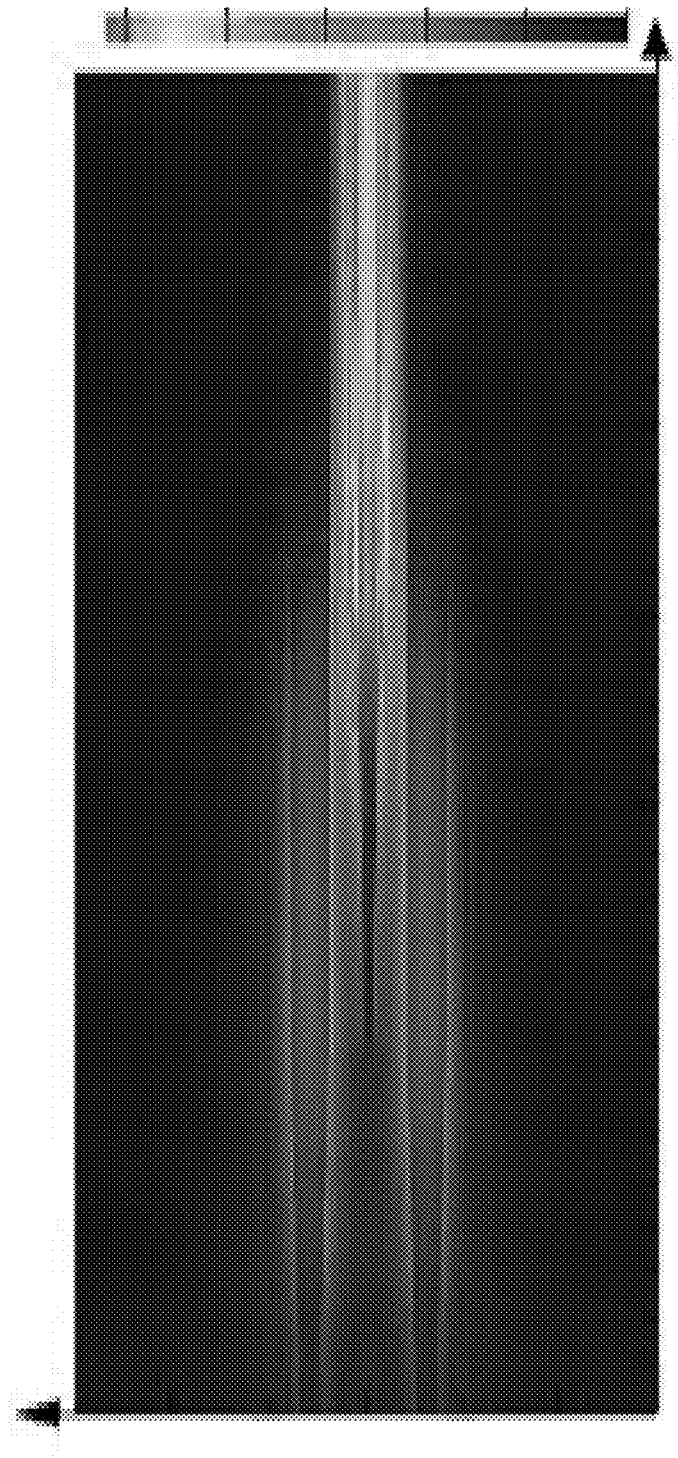
FIG. 13B is a graphical representation of results of a simulation of the structure shown in FIG. 13A.

FIG. 13B shows a top view of simulated |E| (electric field magnitude) for the configuration shown in FIG. 13A.

In FIG. 13A, red is Si. Blue is a user-defined material having n=n-equivalent determined based on the desired mode size. Data such as that described herein with reference to FIGS. 13A and 13B can be used in rapidly determining L1 and L2 values to test, since EME is a relatively rapid simulation technique. For example, one of the L1, L2 values can be held constant and the other can be swept in EME simulations to determine the L1 and L2 values.

To calculate the coupling loss of the real structure, 3D FDTD simulation was performed for the design of the 3 µm BOX device. EME calculation does not account for leakage since metal boundary condition is set at the BOX/substrate interface. With FDTD, PML boundary is used which includes several microns of Si substrate. FDTD calculation considers the initial mode mismatch loss at edges, mode transition loss, as well as leakage. Given the parameter L1=L2=50 µm and W_swg1=W_swg2=400 nm, 3D FDTD simulation is done by Lumerical. Assuming no sidewall roughness, flat band transmission over 86% can be obtained for both TE and TM polarization, given 80 nm inverse taper 314 tip width is used. Increasing the tip width will lead to non-trivial mode mismatch loss for TM but only trivial loss for TE.

To further investigate the mode mismatch loss at the L1/L2 interface, field monitors with a taper tip section were simulated. At the L1/L2 interface, TE Bloch supermode is more confined, hence less light is guided in the middle gap between waveguides 310 and 312 in Stage 1 (FIG. 4). Therefore TE light is not significantly affected by the tip of waveguide 314 at the beginning of Stage 2. However, in Stage 1, the TM Bloch supermode is weakly confined, hence significant portion of light is guided in the middle gap. Therefore TM light is affected by the tip of waveguide 314, which can cause interruption (e.g., mode and index mismatch) for beam propagation. Mode mismatch loss was simulated for various tip widths and showed that loss (especially TM) rises with tip width. However, 80 nm features require a linewidth too narrow for present deep UV optical lithography, whereas 120 nm can be manufactured. In simulation, the TM mode was shown to be affected more strongly by the presence of the central waveguide than was the TE mode.

FDTD simulations with 2 µm BOX wafer were also carried out. With 2 µm BOX, TE loss is increased by 0.2 dB while TM loss is 0.6 to 0.8 dB higher. TM suffers higher leakage than TE since TE mode is more effectively guided than TM.

Referring back to FIG. 5, there is shown a design that can permit reducing the TM mode mismatch loss at L1/L2 junction for large tip width. In the example of FIG. 5, a SWG buffer stage (including waveguide 516) is added between L1 and L2. The SWG buffer waveguide 516 gradually tunes the equivalent refractive index to better match the mode on both sides. The buffering region is designed to be manufacturable in processes providing a 120 nm min feature size. Some examples use a 5 µm long L_buffer with W_buffer1=120 nm (40% duty cycle) and W_buffer2=180 nm (50% duty cycle). The buffer region can be calculated by FDTD with an equivalent structure where dual SWG waveguides 510, 512 are replaced by dual solid strip waveguides with index of 2.457, as discussed above with reference to FIG. 13A. Simulation showed over 98% efficiency over the buffer region can be obtained for TM, and TE almost lossless.

The entire structure with 3 µm BOX was simulated with 3D FDTD to determine the total edge coupler efficiency. In a simulated configuration, the modified structure achieves TE efficiency>89% (0.5 dB loss) and TM>87% (0.6 dB loss) over 100 nm bandwidth. With 120 nm min feature size here with buffered SWG, a tested example achieved TM performance comparable to the performance that might be obtained using an inverse taper tip width of 80 nm or smaller. Therefore, using waveguide 516 can permit fabricating couplers using minimum feature sizes 50% higher than would otherwise be possible.

Simulations were run for the device with 2 µm and 3 µm BOX thickness. Simulation indicates that longer wavelength suffer higher leakage since mode is less confined. With 2 µm BOX wafer, 0.8 dB/facet TE loss and 1.2-1.6 dB/facet TM loss can be obtained.

The measurement setup described above (FIG. 11) was used to measure spectrums of two devices. The loss spectra were normalized with fiber-to-fiber power (FIGS. 10A and 10B) as input baseline. Measurements were performed of edge coupler loss of a device with SWG buffer and having 120 nm min feature size, and of a device without SWG buffer and having 80 nm min feature size.

Including propagation loss, the best performing polarization (assuming TE) can reach 2 dB/facet. An experiment was performed and showed that SWG buffer region reduced the coupling loss.

Figure 14:
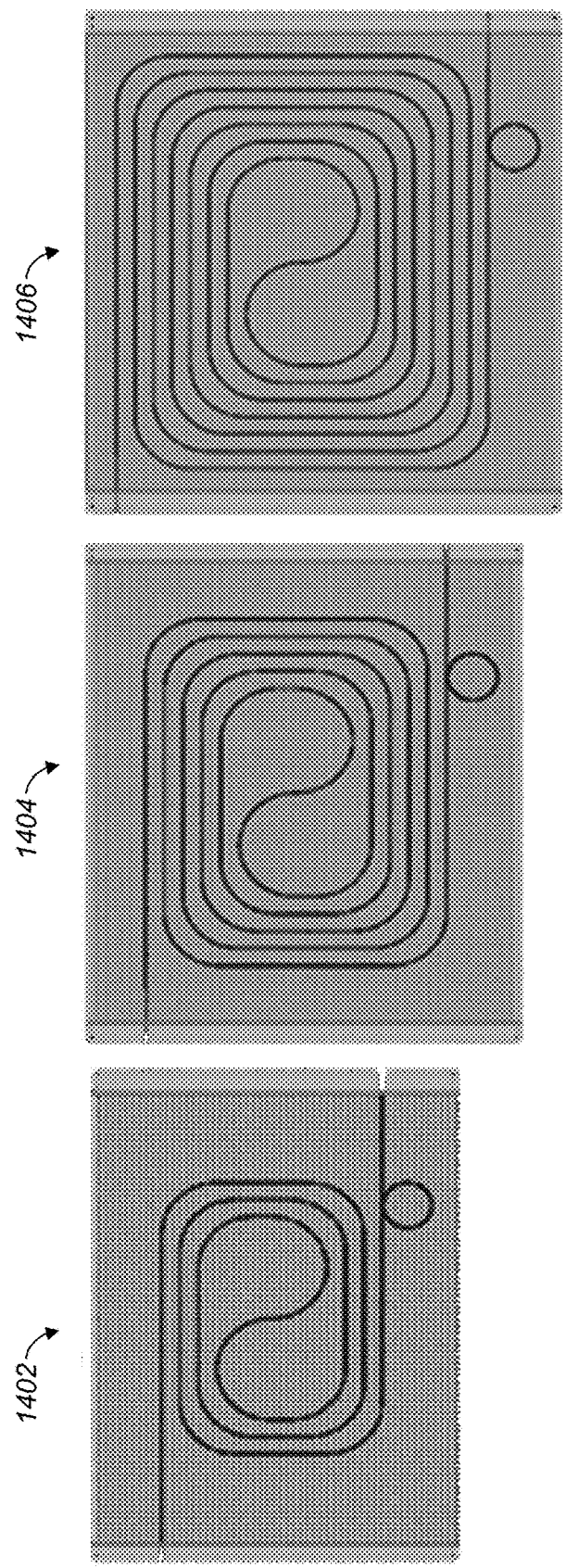
FIG. 14 shows layouts of example spiral waveguides that can be used in testing couplers.

FIG. 14 shows layouts of example spiral waveguides 1402, 1404, and 1406, each of which includes a polarization-detection ring. Propagation loss and scattering loss can be characterized by measuring groups of spiral waveguides. With linear inverse taper, waveguide is spiraled for various loops before reaching the output, which give a variety of straight and bend waveguide length. Here all bends are set the same bending radius (45 µm) as S bend on the chip. Spectrum of both TE and TM are measured while for calculation purposes only data points at 1550 nm wavelength is used. The longer spirals lead to higher accumulated propagation and bending loss which is obtained for both polarization in experiment. Parameters of the waveguides are shown in Table 1.

TABLE 1

| Part No. | Straight Len. | Bend No. | Bend Len (µm) | Total Len (µm) |
| --- | --- | --- | --- | --- |
| 1402 | 1180 | 14 | 990 | 2170 |
| 1404 | 2440 | 22 | 1555 | 3995 |
| 1406 | 4180 | 30 | 2120 | 6300 |

Cut-back method is used which assumes the bending and straight waveguides share equal propagation loss (bending loss is included in propagation loss). With linear approximation, two couplers' total loss can be found where length reaches zero. In a simulated example, edge coupler loss is 3 dB/facet for TM and 2.9 dB/facet for TE. With reference at a spiral total length=4000 μm, accumulated propagation loss becomes 2.4 dB for TM and 2.1 dB for TE. Then propagation loss is normalized to total waveguide length around 450 μm, leading to propagation loss of 0.27 dB for TM and 0.24 dB for TE. In other words, 0.12 dB/facet TE loss can be subtracted, yielding 1.73 dB/facet TE loss at 1520 nm wavelength.

Various examples relate to a meta-trident edge coupler for lensed fiber. Meta-material edge coupler can also be designed with lensed fiber input. Conventional trident edge coupler can already achieve decent overlap to lensed fiber input without much polarization dependence. Nonetheless the interface where inverse taper in the middle is abruptly introduced undesirably introduces mode mismatch loss. As a solution, the SWG buffer idea is adopted from previous meta-trident design to confine beam power more in the middle. The design can be directly converted that SWG is positioned in the middle directly from the beginning, which also provide benefits of tunable mode size by adjusting the SWG duty cycle.

FIG. 15 shows an example coupler useful, e.g., with lensed fiber or other types of fiber. 120 nm tip width dual waveguides 1510, 1512 with 1.2 μm center-to-center spacing together with 200 nm width SWG at 55% duty cycle waveguide 1516 are exposed waveguides at facet 308. At the edge, 95% overlap and 91% power coupling (with Fresnel's reflection considered) can be achieved for both polarizations, assuming 2.5 μm MFD Gaussian mode input. Then the dual waveguide 1510, 1512 widths expands up to 180 nm to increase mode confinement while SWG 1516 width remains unchanged. Finally a linear inverse taper waveguide 1514 is butt coupled to SWG 1516 with negligible mode mismatch loss to finish the rest mode conversion.

In some examples of FIG. 15, the SWG portion 1516 helps to make the structure polarization-independent. For example, lensed fiber can have a small mode. In some examples, the SWG portion 1516 can be tapered. The taper can be determined empirically or via simulation.

In some examples such as that shown in FIG. 15, the center waveguide 1516 can be an exposed waveguide. In some examples, the exposed waveguide is not tapered along a segment of its length, e.g., over the L1 range (left edge to leftmost dashed vertical line in FIG. 15). In some examples, the segment can extend substantially in a longitudinal direction, substantially from (beginning at) the facet 308 of the coupler (left edge in FIG. 15). In some examples, the exposed waveguide has substantially constant width (lateral extent) along the segment of the length of the exposed waveguide, e.g., as in FIG. 15.

In an FDTD simulation, total device length of 35 μm is selected (L1=10 μm & L2=25 μm) according to similar EME equivalent structure estimation. In 3D FDTD, SWG structures as well as linear inverse tapers are calculated with the same device length of 35 μm. Simulation showed inverse taper tip width 180 nm was more effective for TE than for TM, whereas 160 nm was more effective for TM than for TE. With the simulated meta-trident structure, both polarizations showed considerable loss reduction and the spectrum was even flatter, with less than 0.2 dB polarization dependent loss. With 3 μm BOX in simulation, 0.45 dB TE loss and 0.6 dB TM loss can be obtained, assuming no sidewall roughness.

Figure 16A:
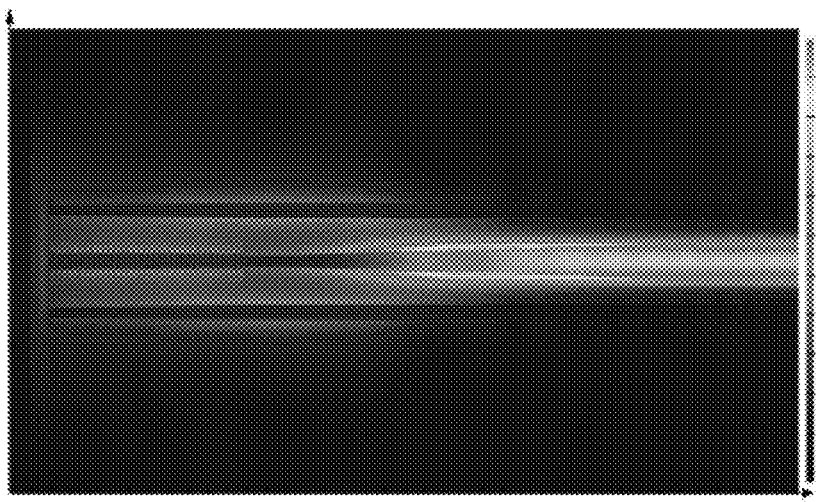
FIGS. 16A and 16B are graphical representations of simulation results of the structure shown in FIG. 15.
Figure 16B:
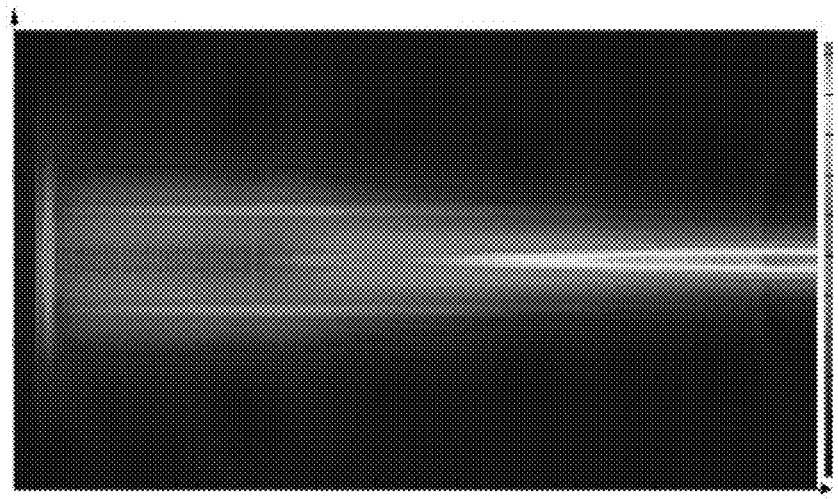

FIG. 16A shows the top view of simulated |E| for TE, and FIG. 16B shoes the top view of simulated |E| for TM. At the junction between L1 and L2, clearly minimal scattering (mode mismatch) was observed in simulation, even with 120 nm min feature size.

During measurement, chip on 3 μm BOX SOI wafer is used. A measured edge coupler loss spectrum included propagating loss (0.12 dB for TE and 0.135 dB for TM). With 5 μm radius ring, TM can couple though 400 nm gap while TE cannot. Therefore in the spectrum, TM exhibited loss spikes at various wavelengths. Subtracting propagation loss, 0.56 dB TM loss and 0.88 dB TM loss were obtained, which matches reasonably well with 0.45 dB TE loss and 0.6 dB TM in simulation, where higher TE loss is caused by sidewall roughness. Comparing with linear inverse taper, TM shows about 1 dB improvement while TE shows only less than 0.3 dB improvement at low wavelength.

Meta-material edge coupler is conventionally designed to use an SWG to trap the input beam in form of Bloch mode with high overlap for both TE and TM polarization. Then by various approaches, Bloch mode is converted into strip waveguide mode as output. In some examples, with high NA flat fiber (4 μm MFD), conventional meta-material edge couplers can reach less than 3 dB loss/facet for both polarizations on 2 μm BOX SOI wafer. To further improve the performance, meta-trident edge coupler is designed to eliminate Bloch-to-strip conversion loss as well as improve facet coupling. With 2 μm BOX SOI wafer, 1.76 dB/facet TE loss has been measured over C band. Although TM loss is not perfectly measured (3 dB/facet), some examples provide about 1 dB improvement when perfectly aligned and additional TM loss reduction can be obtained if 3 μm BOX SOI wafer is used. With lensed fiber input, meta-trident couplers on 3 μm BOX SOI wafer demonstrates 0.56 dB TM loss and 0.88 dB TE loss, which outperform inverse tapers with various tip widths. In some examples, using improved fabrication quality and more accurate measurement, half decibel loss can be achievable at least for TM polarization.

Figure 17:
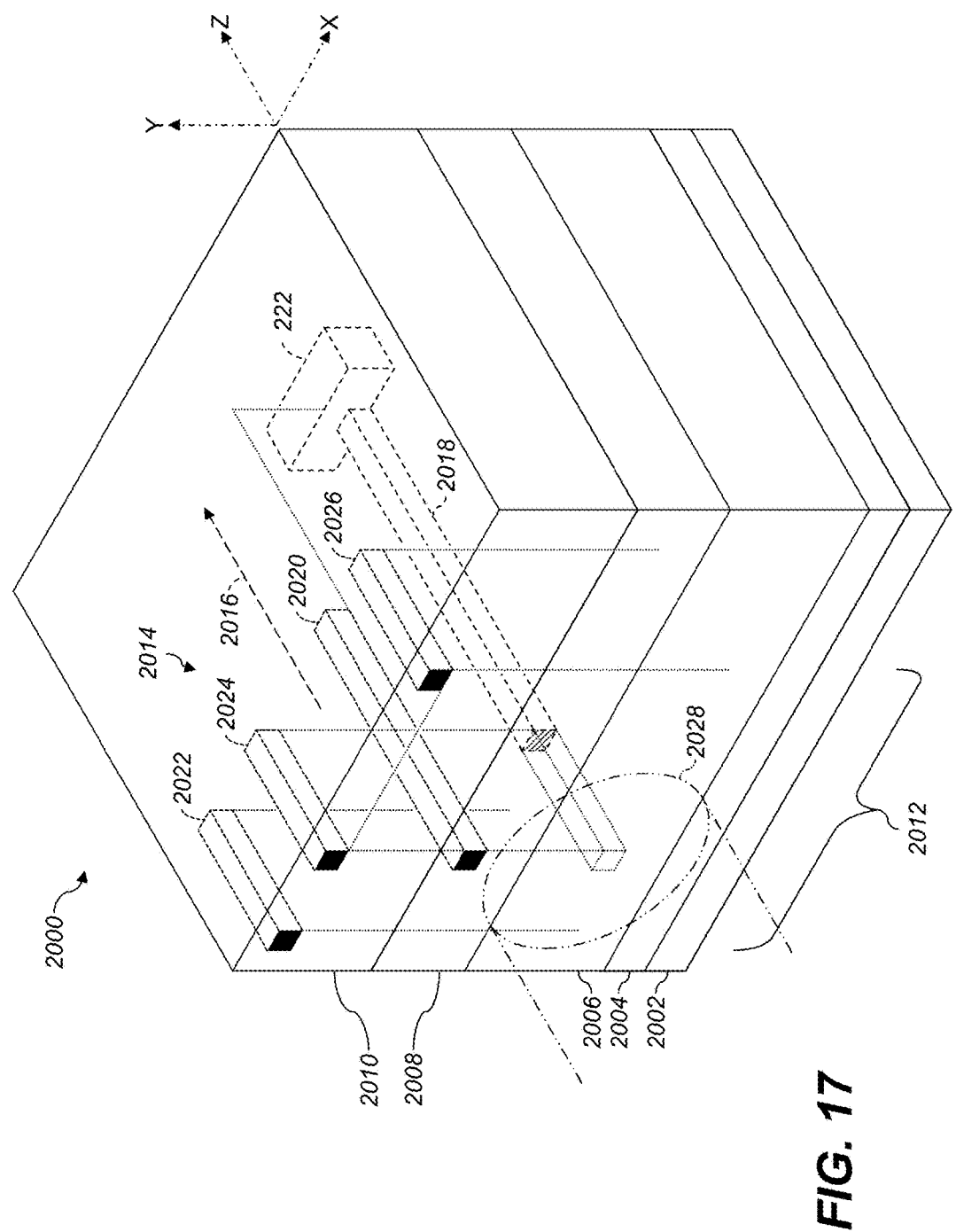
FIG. 17 is an axonometric drawing showing internal components of a silicon photonic device, and related components.
Figure 18A:
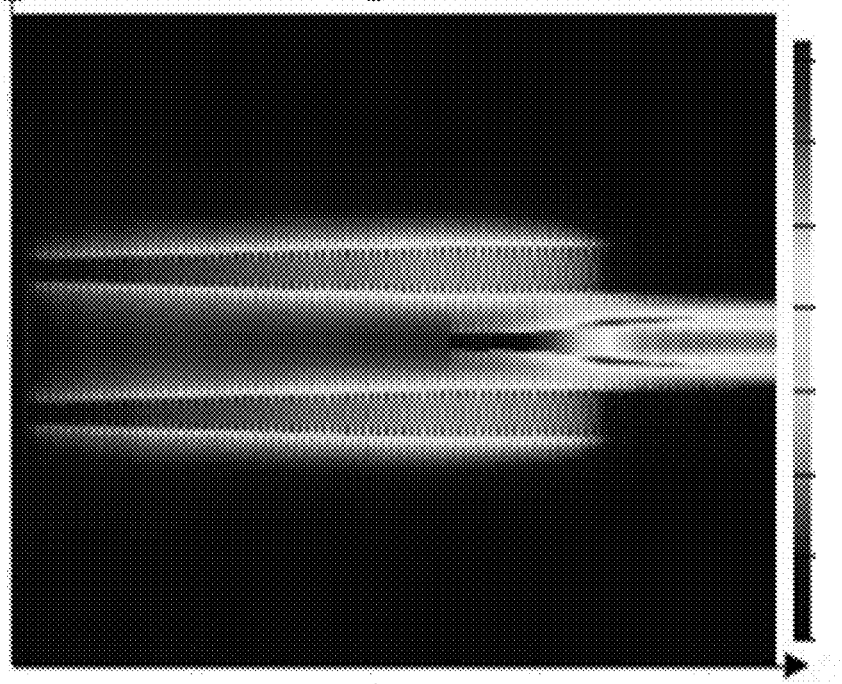
FIGS. 18A and 18B show FDTD simulation results of a structure similar to that shown in FIG. 5.
Figure 18B:
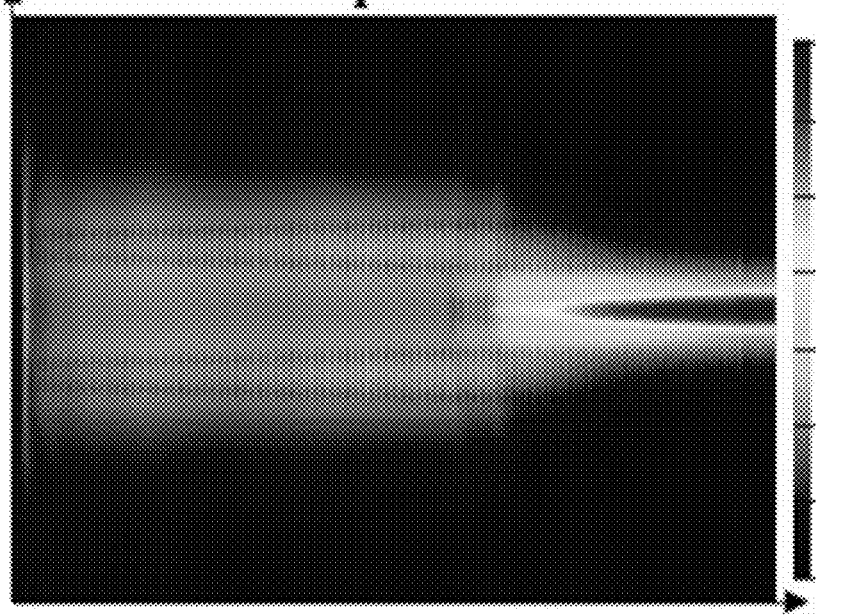
Figure 19A:
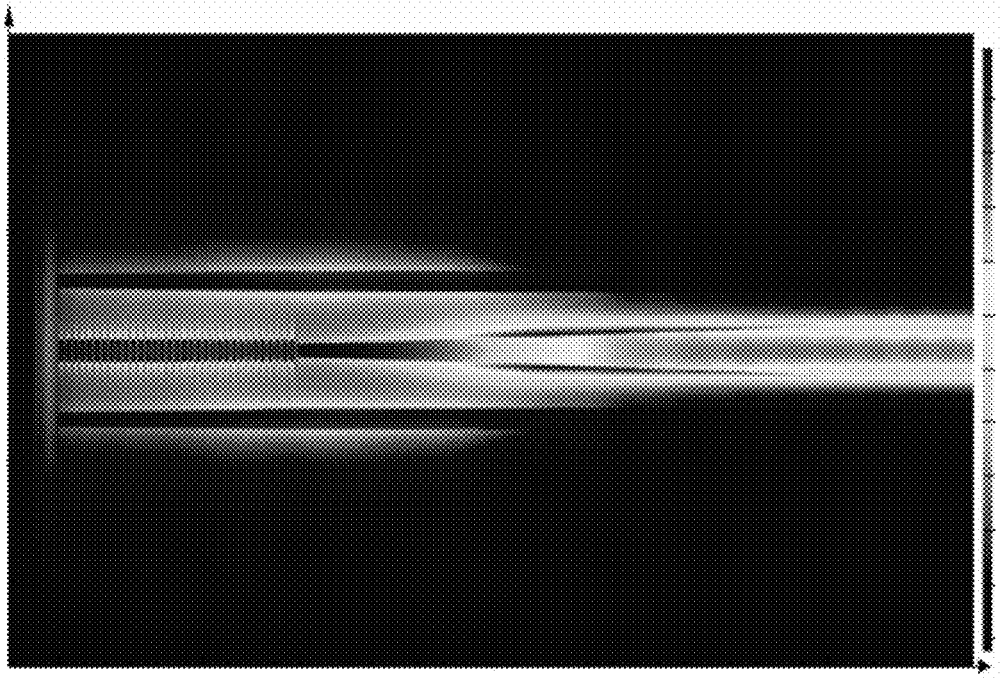
FIGS. 19A and 19B show FDTD simulation results of a structure similar to that shown in FIG. 15.
Figure 19B:
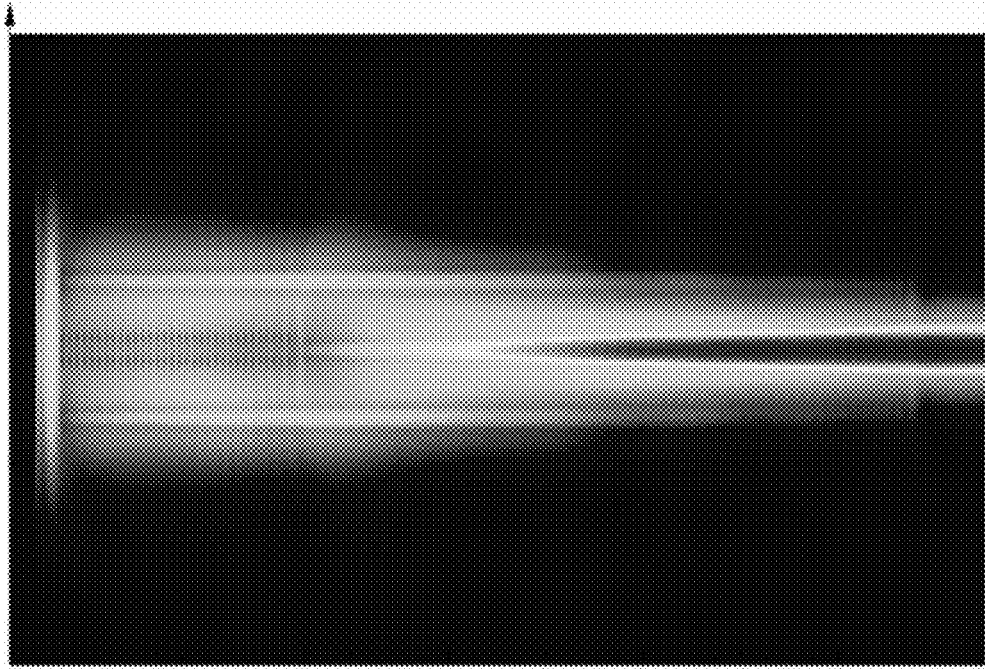

FIG. 17 shows an axonometric drawing showing internal components of a silicon photonic device 2000 (which can represent microchip 302), e.g., an integrated circuit (IC), and related components. For clarity of the drawing, FIG. 20 does not show details of the shapes of the waveguide tapers or metamaterials shown in, e.g., FIG. 3-6C, 7A, 9, 13A, 14, or 15. Instead, the waveguides are depicted as rectangular prisms. Throughout FIG. 20, dotted lines are used to show spatial relationships, and do not themselves represent components. Other layers can be present in device 2000 other than those shown here. For example, other layers can be applied over upper cladding layer 2010, discussed below. X, Y, and Z axes are shown with dash-dot arrows. The depicted components can constitute the entirety of an IC, or only a portion thereof. For example, layers 2002-2010 can extend beyond the boundaries depicted.

Device 2000 includes substrate 2002, e.g., Si or another semiconductor. A plurality of layers is arranged over the substrate 2002, e.g., in a stack. The layers include cladding layer 2004 (e.g., BOX), lower cladding layer 2006 (e.g., $SiO_2$), intermediate cladding layer 2008 (e.g., $SiO_2$), and upper cladding layer 2010 (e.g., $SiO_2$). The cladding layers 2006, 2008, and 2010 can be part of a lower waveguide assembly, an intermediate waveguide assembly, and an upper waveguide assembly, respectively. This is only illustrative, and more or fewer layers can be used.

The layers are configured to define a facet 2012 (which can represent facet 308) at an edge of the device 2000. The facet 2012 can include a portion of the edge of the device 2000. Additionally or alternatively, the facet 2012 can include an indentation, protrusion, or other structure. Facet 2012 is capable of exchanging light with devices or free space outside the device 2000.

The layers are also configured to define an optical coupler 2014 (which can represent coupler 224 or other couplers shown in FIG. 3-7A, 8, 13A, or 15) extending away from the facet 2012 at least in a longitudinal direction 2016, e.g., into the IC. For example, direction 2016 can be substantially normal to facet 2012. In some examples, longitudinal direction 2016 is the Z axis shown in FIG. 3-7A or 15. The optical coupler 2014 can include a plurality of waveguides, each at least partly encapsulated within a corresponding cladding layer. In some examples, each waveguide has a higher refractive index than any of the cladding layer(s) within which it is at least partly encapsulated. In some examples, all the waveguides of the coupler are in one layer.

In the illustrated example, lower waveguide 2018 (e.g., Si) is encapsulated within lower cladding layer 2006 (S0). Lower waveguide 2018 does not reach facet 2012. A dotted box extending from lower waveguide 2018 shows more clearly how lower waveguide 2018 is arranged within layer 2006. The end of lower waveguide 2018 closest to facet 2012 is depicted as a hatched quadrilateral.

Intermediate waveguide 2020 is encapsulated within intermediate cladding layer 2008. In some examples, waveguide 2020 reaches facet 2012 and has a tapered segment beginning substantially at facet 2012. Upper waveguides 2022, 2024, and 2026 are encapsulated within upper cladding layer 2010. Lower waveguide 2018 extends farther from the facet 2012 in the longitudinal direction 2016 than does a second waveguide of the plurality of waveguides. The second waveguide can be, e.g., intermediate waveguide 2020 or any of the upper waveguides 2022, 2024, and 2026. Moreover, any of those choices for the second waveguide is located farther above the substrate 2002 than is the lower waveguide 2018. This arrangement, using dimensions selected as described herein based on the wavelength of light to be coupled, permits light incident on facet 2012 to be effectively coupled to lower waveguide 2018, which can then provide the light to active unit 222. Additionally or alternatively, light produced by active unit 222 can be effectively coupled from lower waveguide 2018 out to facet 2012, from which it can be received by a lens, fiber, or other optical system. An example is shown in phantom of fiber 2028 butt-spliced with facet 2012. The illustrated fiber 2028 can be, e.g., a single-mode fiber having an MFD of 4 μm.

In some examples, waveguides in device 2000 are arranged only with respect to layers 2002, 2004, and 2006. In some examples, layers 2008 and 2010 are omitted, or do not include or retain waveguides. For example, in the configuration described herein with reference to FIG. 6, substrate 2002 is the Si substrate of FIG. 6, cladding layer 2004 is the 3 μm BOX, and lower cladding layer 2006 is the 3 μm top clad. Waveguide 2018 represents the 220 nm high waveguide encapsulated by the BOX and the top clad. In the example of FIG. 6, waveguide 2018 does reach facet 2012. In some examples, e.g., as shown in FIGS. 3-5, 13, 13A, 14, and 15, multiple waveguides are arranged in or at least partly encapsulated by cladding layer 2006, spaced apart laterally. Lateral spacing is exhibited, in the example of FIG. 17, by waveguides 2022, 2024, and 2026.

In the configuration described herein with reference to FIG. 8, substrate 2002 is the Si substrate of FIG. 9. Layer 2004 is the BOX. Waveguide 2018 represents the Si waveguides over the BOX. Layers 2004 or 2006 represent the LTO cladding shown in FIG. 8, operation (4) (e.g., operations 1206 or 1218, FIG. 12).

In some examples, fiber 2028 can be retained by a V-groove (omitted for clarity of the drawing). For example, fiber 2028 can be held in a V-groove of a V-groove array, e.g., made of PYREX, optical glass, or another glass, or quartz, silicon or another crystalline solid. The V-groove or V-groove array can be retained in position with respect to device 2000, e.g., using optically-clear adhesive (OCA), index-matched adhesive, mechanical retention features such as clips or braces, or other retaining features.

In some examples, device 2000 can include multiple assemblies such as that shown. Each assembly can include, e.g., facet 2012 and optical coupler 2014, or facet 2012, optical coupler 2014, and active unit 222). The assemblies can be arranged along one edge of an IC or multiple edges, or any combination thereof. For example, multiple copies of the components shown can be included in the IC, spaced apart along the X axis. Accordingly, the depicted axes are not limiting, and any edge of an IC can be used to form optical couplers and other structures shown. In some examples, n couplers are arranged along one edge, and an n-groove V-groove array is retained in position with respect to the n couplers so that n fibers are spliced or otherwise aligned to respective couplers of then couplers. E.g., n=10.

As discussed herein, the arrangement of waveguides at facet 2012 permits effectively receiving the mode from the fiber 2028 with increased tolerance for misalignment compared to prior schemes. Therefore, optical couplers 2014 and devices 2000 as described herein can be used with passive alignment of individual fibers or fiber arrays (e.g., V-groove arrays). Couplers herein can therefore reduce the need for active alignment of fibers or arrays during assembly or use of photonic systems.

In some examples, facet 2012 can receive a free-space signal, e.g., light focused by a lens or other optics on to the facet 2012. In some examples, facet 2012 can emit a free-space signal to be received by another optical component, e.g., another device 2000. Accordingly, in some examples, device(s) 2000 can be used for free-space or fiber-mediated optical communication or power transfer, e.g., chip-to-chip communication or power transfer.

Example Features

Some examples include any combination one or more of, including any combination of any number of, the features described in this section and set forth below. As used herein, references to "dielectric" can additionally or alternatively refer to other materials that have relatively low absorption loss in the wavelength bands of interest, e.g., <10% or <1%. References to "dielectric" can additionally or alternatively refer to TiN, polymers, or other substances having a higher index of refraction than the insulating layer (e.g., the $SiO_2$), e.g., ≤1% higher, ≤5% higher, ≤10% higher, ≤20% higher, about 40% higher, ≤40% higher, ≤50% higher, or ≤100% higher. Similarly, references herein to silicon dioxide ($SiO_2$) can additionally or alternatively refer to silicon oxides with different numbers of Si and O atoms per molecule. References to $SiO_2$ can additionally or alternatively refer to polymers having refractive indexes similar to that of silicon dioxide (e.g., ±5%, ±10%, or ±25%). References herein to silicon nitride (SiN) can additionally or alternatively refer to silicon nitrides with different numbers of Si and N atoms per molecule. References herein to silicon nitride (SiN) can additionally or alternatively refer to polymers having refractive indexes similar to that of silicon nitride (e.g., ±5%, ±10%, or ±25%). References to "light" are not confined to visible light, but can additionally or alternatively include infrared or ultraviolet light, or other electromagnetic radiation, e.g., having a frequency above 3 THz (wavelength shorter than 100 μm). In features A-H, and in the Example Clauses, below, parenthetical remarks are for example and explanation, and are not limiting. Parenthetical remarks given in this Illustrative Examples section or in the Example Clauses section with respect to specific language apply to corresponding language throughout the respective section, unless otherwise indicated.

In some examples, to design a coupler according to some examples herein, the TE and TM transition windows can be found separately, e.g., based on the material properties or design rules of the silicon process. A transition window is a range of waveguide width expansions during which TE or TM (respectively) mode evolutions can occur and the mode area changes most steeply, e.g., 10%-90% or 20%-80% of the transition. For example, for TM, a relatively wider waveguide can be used compared to TE, so that the evanescent field and the leakage shrink. For TE, a narrow waveguide can be used. Therefore, a coupler can be designed that first uses wider confinement waveguide to hold the mode during TM coupling in order to reduce leakage, then, farther along the length of the waveguide, tapers down the confinement waveguide and starts TE mode coupling with relaxed coupling challenge. In some examples, the TE section is longer to fully utilize the TE transition window. As noted herein, the coupler is bidirectional in some examples. Therefore, light emitted by active unit 222 can transfer TE fields closer to active unit 222, then TM fields farther from active unit 222.

A: A coupler including at least two subwavelength waveguides (SWGs) and configured to optically couple with a high-NA fiber input. (Some examples are configured to support fundamental mode of both TE and TM, matching well with input mode size.)

B: A coupler including a trident configuration having an inverse-tapered waveguide spatially between two SWG waveguides. (Some examples are configured to convert Bloch mode into strip mode directly by evanescent coupling.)

C: A coupler as in paragraph B, further comprising a short buffered SWG in front of the inverse-tapered waveguide. (Some examples reduce mode mismatch loss, e.g., for TM, while permitting wider tip widths of the inverse-tapered waveguide than would otherwise be possible for a given degree of mode mismatch loss.)

D: A coupler as in any of paragraphs A-C, further comprising a thick buried oxide (BOX) layer. (Some examples provide increased TM coupling efficiency and reduced leakage loss as BOX thickness increases.)

E: A coupler as in any of paragraphs A-D, configured to operate in the infrared O band (~1260 nm-~1360 nm).

F: A coupler as in any of paragraphs A-E, comprising index-matching material in place of at least some of the semiconductor substrate of the coupler. (Some examples permit the coupler to operate with a larger mode area, e.g., as in SMF-28 fiber.)

G: A method of designing a coupler as in any of paragraphs A-F, the method comprising determining dimensions so that TE and TM have similar mode sizes, and then tuning n-effective to reduce polarization dependence.

H: A method of making a coupler as in any of paragraphs A-F, the method comprising designing the coupler as recited in paragraph G; and fabricating the coupler using Si or SOI wafer processing operations.

Example Clauses

Various examples include one or more of, including any combination of any number of, the following example features. Throughout these clauses, parenthetical remarks are for example and explanation, and are not limiting. Other examples of such features may be given throughout this application. Parenthetical remarks given in this Example Clauses section with respect to specific language apply to corresponding language throughout this document, unless otherwise indicated. Various examples additionally include one or more of, including any combination of any number of, the features listed in the "Example Features" section above I: An optical coupler, comprising: a semiconductor substrate; a first insulating layer arranged over the semiconductor substrate; a facet in the insulating layer extending substantially in a lateral direction; a plurality of dielectric waveguides arranged over the first insulating layer and spaced apart from each other laterally, the plurality of dielectric waveguides comprising: a first exposed waveguide comprising a plurality of first spaced-apart dielectric segments arranged substantially along a longitudinal direction of the coupler; a second exposed waveguide; and a first buried waveguide; and a second insulating layer at least partly encapsulating the plurality of dielectric waveguides.

J: The optical coupler according to paragraph I, wherein at least some of the first spaced-apart dielectric segments are arranged to form a subwavelength grating (SWG) configured to entrain electromagnetic radiation having a wavelength shorter than DD μm.

K: The optical coupler according to any of paragraphs I-J, wherein the first exposed waveguide is tapered along at least part of its length.

L: The optical coupler according to any of paragraphs I-J, wherein the first exposed waveguide has a substantially constant lateral extent along a segment of its length, the segment extending substantially in a longitudinal direction substantially from the facet.

M: The optical coupler according to paragraph L, wherein the second exposed waveguide is tapered along a segment of its length, the segment of the length of the second exposed waveguide extending substantially from the facet.

N: The optical coupler according to any of paragraphs I-M, wherein the second exposed waveguide comprises a plurality of second spaced-apart dielectric segments arranged substantially along a longitudinal direction of the coupler.

O: The optical coupler according to paragraph N, wherein the second exposed waveguide is tapered along at least part of its length.

P: The optical coupler according to any of paragraphs N-O, wherein at least some of the second spaced-apart dielectric segments are arranged to form a subwavelength grating (SWG) configured to entrain electromagnetic radiation having a wavelength shorter than DD μm.

Q: The optical coupler according to paragraph P, wherein at least some of the first spaced-apart dielectric segments are arranged to form a subwavelength grating (SWG) configured to entrain electromagnetic radiation having the wavelength shorter than DD μm.

R: The optical coupler according to any of paragraphs I-Q, wherein: the plurality of dielectric waveguides further comprises a second buried waveguide; the second buried waveguide comprises a plurality of third spaced-apart dielectric segments arranged substantially along a longitudinal direction of the coupler; a longitudinal axis of the second buried waveguide substantially coincides with a longitudinal axis of the first buried waveguide; and the second buried waveguide is arranged longitudinally between the facet and the first buried waveguide.

S: The optical coupler according to paragraph R, wherein the second buried waveguide is spaced apart longitudinally from the facet.

T: The optical coupler according to any of paragraphs R-S, wherein at least some of the third spaced-apart dielectric segments are arranged to form a subwavelength grating (SWG) configured to entrain electromagnetic radiation having a wavelength shorter than DD µm.

U: The optical coupler according to any of paragraphs I-T, wherein: the semiconductor substrate comprises monocrystalline silicon; the first insulating layer comprises buried oxide; the second insulating layer comprises silicon oxide; or the dielectric waveguides comprise silicon nitride.

V: The optical coupler according to any of paragraphs I-U, further comprising an active unit optically connected with the first buried waveguide.

W: The optical coupler according to any of paragraphs I-V, wherein the first buried waveguide is tapered along at least part of its length.

X: A method comprising manufacturing a coupler according to any of paragraphs I-W using silicon wafer processing steps.

Y: A device comprising: optical coupler(s) according to any of paragraphs I-W; and active unit(s) operatively coupled to respective optical coupler(s).

Z: The device according to paragraph Y, further comprising a processor operatively coupled to the active unit(s) to at least transmit or receive data.

AA: The device according to paragraph Y or Z, the optical coupler(s) comprising a plurality of the optical couplers.

AB: An optical coupler (224), comprising: a semiconductor substrate (Si, FIG. 6A); a first cladding layer (BOX, FIG. 6A) arranged at least partly over the semiconductor substrate; a second cladding layer (top clad, FIG. 6A) arranged at least partly over the first cladding layer with respect to the semiconductor substrate; a facet 308) in the first cladding layer and in the second cladding layer, the facet extending substantially in a lateral direction (e.g., ±X) (e.g., forming an angle of at least seventy-five degrees with the longitudinal direction); and a plurality of waveguides arranged over the first insulating layer with respect to the semiconductor substrate, wherein the plurality of waveguides comprises: a first exposed waveguide (e.g., waveguides that reach the facet such as 310, 312, or 1516; this can be one of the prongs of a trident, or a buffer) comprising a plurality of first spaced-apart segments arranged substantially along a longitudinal direction; a second exposed waveguide; and a first buried waveguide (e.g., waveguides that do not reach the facet such as 314 or 1514); and wherein at least two of the waveguides of the plurality of waveguides: are at least partly encapsulated in the second cladding layer; have respective refractive indices higher than a refractive index of the second cladding layer; and are spaced apart from each other along the lateral direction.

AC: The optical coupler according to claim AB, wherein: the semiconductor substrate comprises crystalline silicon or a III-V semiconductor; the first cladding layer comprises buried oxide; the second cladding layer comprises silicon oxide; or at least one of the plurality of waveguides comprises silicon.

AD: The optical coupler according to claim AB, wherein: at least some of the first spaced-apart segments are arranged to form a subwavelength grating (SWG); the at least some of the first spaced-apart segments have substantially equal extents in the lateral direction (e.g., X) and in a third direction (e.g, Y) that is substantially perpendicular to both the lateral direction and the longitudinal direction (e.g., Z); the at least some of the first spaced-apart segments are spaced apart in the longitudinal direction substantially evenly; the at least some of the first spaced-apart segments have substantially equal lengths (L) in the longitudinal direction; and the at least some of the first spaced-apart segments are separated from each other by gaps extending in the longitudinal direction a distance substantially equal to a grating period (Λ) minus the lengths L (e.g., L=DΛ for duty cycle D).

AE: The optical coupler according to claim AB, wherein the first exposed waveguide is tapered along at least part of its length (e.g., waveguides 310, 312 in Stage 1, FIG. 4).

AF: The optical coupler according to claim AB, wherein the first exposed waveguide has a substantially constant lateral extent along a portion of its length, the portion extending substantially in the longitudinal direction substantially from the facet (e.g., waveguide 1516).

AG: The optical coupler according to claim AF, wherein the second exposed waveguide is tapered along a portion of its length, the portion of the length of the second exposed waveguide extending substantially from the facet (e.g., waveguide 1514).

AH: The optical coupler according to claim AB, wherein the second exposed waveguide comprises a plurality of second spaced-apart segments arranged substantially along the longitudinal direction (e.g., waveguides 310, 312).

AI: The optical coupler according to claim AH, wherein the second exposed waveguide is tapered along at least a portion of its length (e.g., waveguides 310, 312).

AJ: The optical coupler according to claim AH, wherein at least some of the second spaced-apart segments are arranged to form a subwavelength grating (SWG) configured to entrain electromagnetic radiation having a wavelength shorter than one hundred microns.

AK: The optical coupler according to claim AJ, wherein at least some of the first spaced-apart segments are arranged to form a subwavelength grating (SWG) configured to entrain electromagnetic radiation having the wavelength shorter than one hundred microns.

AL: The optical coupler according to claim AB, wherein: the plurality of waveguides further comprises a second buried waveguide (e.g., waveguide 516); the second buried waveguide comprises a plurality of third spaced-apart segments arranged substantially along the longitudinal direction; a longitudinal axis of the second buried waveguide substantially coincides with a longitudinal axis of the first buried waveguide (e.g., waveguide 514); and the second buried waveguide is arranged longitudinally between the facet (308) and the first buried waveguide.

AM: The optical coupler according to claim AL, wherein the second buried waveguide is spaced apart longitudinally from the facet (e.g., by length L1, FIG. 5).

AN: The optical coupler according to claim AL, wherein at least some of the third spaced-apart segments are arranged to form a subwavelength grating (SWG) configured to entrain electromagnetic radiation having a wavelength shorter than one hundred microns.

AO: The optical coupler according to claim AB, wherein: the semiconductor substrate comprises monocrystalline silicon; the first insulating layer comprises buried oxide; the second insulating layer comprises silicon oxide; or at least one waveguide of the plurality of waveguides comprises silicon nitride (e.g., as in FIG. 6A).

AP: The optical coupler according to claim AB, further comprising an active unit (222) optically connected with the first buried waveguide (e.g., waveguide 314, 514, or 1514).

AQ: The optical coupler according to claim AB, wherein the first buried waveguide is tapered along at least part of its length (e.g., waveguide 314 in Stage 2, FIG. 4).

AR: An assembly comprising: a semiconductor photonic device (2000) having: a substrate; a plurality of facets; and a plurality of optical couplers associated with respective facets of the plurality of facets; and a plurality of single-mode optical fibers (2028) disposed in a splice configuration with respect to respective facets of the plurality of facets; wherein each optical coupler of the plurality of optical couplers comprises: a respective buried waveguide; and means for coupling an electromagnetic field incident on the facet towards the respective buried waveguide as the electromagnetic field proceeds into the semiconductor photonic device (e.g., FIG. 17).

AS: The assembly according to claim AR, further comprising a V-groove array configured to retain the single-mode optical fibers in position with respect to the respective facets.

AT: The assembly according to claim AR, wherein each optical coupler comprises: a respective first exposed waveguide (310); and a respective second exposed waveguide; (312) wherein the respective first exposed waveguide, the respective buried waveguide (314), and the respective second exposed waveguide of each optical coupler are spaced apart in a lateral direction (e.g., ±X, FIG. 3) of that optical coupler; and at least one of the respective first exposed waveguide, the respective buried waveguide, and the respective second exposed waveguide of each optical coupler comprises a plurality of segments spaced apart in a longitudinal direction (e.g., ±Z, FIG. 3) of that optical coupler.

AU: The assembly according to claim AR, wherein: the semiconductor photonic device comprises a cladding layer (e.g., top clad, FIG. 6A); and the respective first exposed waveguides and the respective second exposed waveguides: are at least partly encapsulated in the cladding layer (e.g., as in FIG. 6A); and have respective indices of refraction that are higher than an index of refraction of the cladding layer.

CONCLUSION

In view of the foregoing, various aspects provide an optical coupler that can, e.g., effectively couple optical energy between a single-mode optical fiber and a silicon waveguide on an integrated circuit (IC). A technical effect is to gradually expand or contract the mode field diameter, depending on the direction of propagation.

The operations of example processes herein are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, or executed in parallel to implement the described processes. The described processes can be performed by resources associated with one or more computing systems 201, 202 or processors 286, such as one or more internal or external CPUs or GPUs, or one or more pieces of hardware logic such as FPGAs, DSPs, or other types of accelerators.

The methods and processes described above can be embodied in, and fully automated via, software code modules executed by one or more general purpose computers or processors. The code modules can be stored in any type of computer-readable storage medium or other computer storage medium. Some or all of the methods can alternatively be embodied in specialized computer hardware. For example, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example. The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

Although some features and examples herein have been described in language specific to structural features or methodological steps, it is to be understood that the subject matter herein is not necessarily limited to the specific features or steps described. Any process descriptions, elements or blocks in the flow diagrams described herein or depicted in the attached figures should be understood as potentially representing modules, segments, or portions of code that include one or more executable instructions for implementing specific logical functions or elements in the process. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

The invention claimed is:

1. An optical coupler, comprising:
a semiconductor substrate;
a first cladding layer arranged at least partly over the semiconductor substrate;
a second cladding layer arranged at least partly over the first cladding layer with respect to the semiconductor substrate;
a facet in the first cladding layer and in the second cladding layer, the facet extending substantially in a lateral direction; and
a plurality of waveguides arranged over the first cladding layer with respect to the semiconductor substrate,
wherein the plurality of waveguides comprises:
a first waveguide comprising a plurality of first spaced-apart segments arranged substantially along a longitudinal direction;
a second waveguide; and
a third waveguide spaced farther from the facet longitudinally than at least one of the first waveguide and the second waveguide; and
wherein at least two of the waveguides of the plurality of waveguides:
are at least partly encapsulated in the second cladding layer;
have respective refractive indices higher than a refractive index of the second cladding layer; and
are spaced apart from each other along the lateral direction.

2. The optical coupler according to claim 1, wherein:
the semiconductor substrate comprises crystalline silicon or a III-V semiconductor;
the first cladding layer comprises buried oxide;
the second cladding layer comprises silicon oxide; or
at least one of the plurality of waveguides comprises silicon.

3. The optical coupler according to claim 1, wherein:
at least some of the first spaced-apart segments are arranged to form a subwavelength grating (SWG);
the at least some of the first spaced-apart segments have substantially equal extents in the lateral direction and in a third direction that is substantially perpendicular to both the lateral direction and the longitudinal direction;

the at least some of the first spaced-apart segments are spaced apart in the longitudinal direction substantially evenly;
the at least some of the first spaced-apart segments have substantially equal lengths (L) in the longitudinal direction; and
the at least some of the first spaced-apart segments are separated from each other by gaps extending in the longitudinal direction a distance substantially equal to a grating period ($\Lambda$) minus the lengths L.

4. The optical coupler according to claim 1, wherein at least:
the first waveguide is tapered along at least part of its length; or
the third waveguide is tapered along at least part of its length.

5. The optical coupler according to claim 1, wherein the first waveguide has a substantially constant lateral extent along a portion of its length, the portion extending substantially in the longitudinal direction substantially from the facet.

6. The optical coupler according to claim 5, wherein the second waveguide is tapered along a portion of its length, the portion of the length of the second waveguide extending substantially from the facet.

7. The optical coupler according to claim 1, wherein the second waveguide comprises a plurality of second spaced-apart segments arranged substantially along the longitudinal direction.

8. The optical coupler according to claim 7, wherein the second waveguide is tapered along at least a portion of its length.

9. The optical coupler according to claim 7, wherein at least some of the second spaced-apart segments are arranged to form a subwavelength grating (SWG) configured to entrain electromagnetic radiation having a wavelength shorter than one hundred microns.

10. The optical coupler according to claim 9, wherein at least some of the first spaced-apart segments are arranged to form a subwavelength grating (SWG) configured to entrain electromagnetic radiation having the wavelength shorter than one hundred microns.

11. The optical coupler according to claim 1, wherein:
the plurality of waveguides further comprises a fourth waveguide spaced apart longitudinally from the facet;
the fourth waveguide comprises a plurality of third spaced-apart segments arranged substantially along the longitudinal direction;
a longitudinal axis of the fourth waveguide substantially coincides with a longitudinal axis of the fourth waveguide; and
the fourth waveguide is arranged longitudinally between the facet and the third waveguide.

12. The optical coupler according to claim 11, wherein at least some of the third spaced-apart segments are arranged to form a subwavelength grating (SWG) configured to entrain electromagnetic radiation having a wavelength shorter than one hundred microns.

13. The optical coupler according to claim 1, wherein:
the semiconductor substrate comprises monocrystalline silicon;
the first cladding layer comprises buried oxide;
the second cladding layer comprises silicon oxide; or
at least one waveguide of the plurality of waveguides comprises silicon nitride.

14. The optical coupler according to claim 1, further comprising an active unit optically connected with the third waveguide.

15. An assembly comprising:
a semiconductor photonic device having:
a substrate;
a plurality of facets; and
a plurality of optical couplers associated with respective facets of the plurality of facets; and
a plurality of single-mode optical fibers disposed in a splice configuration with respect to respective facets of the plurality of facets;
wherein each optical coupler of the plurality of optical couplers comprises:
a respective first waveguide spaced apart from the respective facet of the plurality of facets; and
means for coupling an electromagnetic field incident on the respective facet towards the respective first waveguide as the electromagnetic field proceeds into the semiconductor photonic device.

16. The assembly according to claim 15, further comprising a V-groove array configured to retain the single-mode optical fibers in position with respect to the respective facets.

17. The assembly according to claim 15, wherein each optical coupler comprises:
a respective second waveguide; and
a respective third waveguide;
wherein the respective second waveguide, the respective first waveguide, and the respective third waveguide of each optical coupler are spaced apart in a lateral direction of that optical coupler; and
at least one of the respective second waveguide, the respective first waveguide, and the respective third waveguide of each optical coupler comprises a plurality of segments spaced apart in a longitudinal direction of that optical coupler.

18. The assembly according to claim 15, wherein:
the semiconductor photonic device comprises a cladding layer; and
the respective first waveguides and the respective second waveguides:
are at least partly encapsulated in the cladding layer; and
have respective indices of refraction that are higher than an index of refraction of the cladding layer.

19. An assembly, wherein:
the assembly comprises a semiconductor photonic device having:
a plurality of facets; and
a plurality of optical couplers associated with respective facets of the plurality of facets;
each optical coupler of the plurality of optical couplers comprises:
a respective first waveguide;
a respective second waveguide spaced apart from the respective facet; and
a respective third waveguide; and
in each optical coupler:
the respective first waveguide, the respective second waveguide, and the respective third waveguide are spaced apart in a lateral direction of that optical coupler; and
at least one of the respective first waveguide, the respective second waveguide, and the respective third waveguide comprises a plurality of segments spaced apart in a longitudinal direction of that optical coupler.

20. The assembly according to claim 19, further comprising a plurality of single-mode optical fibers disposed in a splice configuration with respect to respective facets of the plurality of facets.

* * * * *